United States Patent
Koike et al.

(10) Patent No.: US 10,010,892 B2
(45) Date of Patent: Jul. 3, 2018

(54) FILTER

(71) Applicant: YUPO CORPORATION, Tokyo (JP)

(72) Inventors: Hiroshi Koike, Ibaraki (JP); Yuichi Yahagi, Ibaraki (JP); Seiichiro Iida, Tokyo (JP)

(73) Assignee: YUPO CORPORATION, Tokyo (JP)

( * ) Notice: Subject to any disclaimer, the term of this patent is extended or adjusted under 35 U.S.C. 154(b) by 49 days.

(21) Appl. No.: 15/028,849

(22) PCT Filed: Oct. 15, 2014

(86) PCT No.: PCT/JP2014/077474
§ 371 (c)(1),
(2) Date: Apr. 12, 2016

(87) PCT Pub. No.: WO2015/056724
PCT Pub. Date: Apr. 23, 2015

(65) Prior Publication Data
US 2016/0250649 A1   Sep. 1, 2016

(30) Foreign Application Priority Data

Oct. 15, 2013   (JP) .................................. 2013-214325

(51) Int. Cl.
*B03C 3/64* (2006.01)
*B03C 3/28* (2006.01)
(Continued)

(52) U.S. Cl.
CPC ............ *B03C 3/64* (2013.01); *B01D 39/1623* (2013.01); *B01D 39/1692* (2013.01);
(Continued)

(58) Field of Classification Search
CPC combination set(s) only.
See application file for complete search history.

(56) References Cited

U.S. PATENT DOCUMENTS 3,550,257 A * 12/1970 Burton ....................... B03C 3/28
                                                              29/33 Q
3,967,027 A *  6/1976 Igarashi .................. B32B 27/06
                                                              156/274.4
(Continued)

FOREIGN PATENT DOCUMENTS

CN          1092484 A     9/1994
CN        102150225 A     8/2011
(Continued)

OTHER PUBLICATIONS

International Search Report issued with respect to application No. PCT/JP20141077474, dated Jan. 27, 2015.
(Continued)

*Primary Examiner* — Robert A Hopkins
*Assistant Examiner* — Sonji Turner
(74) *Attorney, Agent, or Firm* — Greenblum & Bernstein, P.L.C.

(57) ABSTRACT

An object of the present invention is to provide a low pressure loss filter having a high dust- and dirt-collecting capability and excellent workability and sustainability of collecting capability. The filter of the present invention is a filter having air channels formed using an electret sheet; a porosity of the electret sheet being from 1 to 70%; an air channel cross-sectional ratio of the filter being from 10 to 99%; and a volume charge density of the filter being from 10 to 5000 $nC/cm^3$.

10 Claims, 12 Drawing Sheets

(51) Int. Cl.
  *B01D 46/00* (2006.01)
  *B01D 46/52* (2006.01)
  *B01D 39/16* (2006.01)
  *B03C 3/47* (2006.01)
  *B03C 3/41* (2006.01)

(52) U.S. Cl.
  CPC ....... *B01D 46/0032* (2013.01); *B01D 46/526* (2013.01); *B03C 3/28* (2013.01); *B03C 3/41* (2013.01); *B03C 3/47* (2013.01); *B01D 2239/0435* (2013.01); *B01D 2239/065* (2013.01); *B01D 2239/069* (2013.01); *B03C 2201/10* (2013.01)

(56) References Cited

U.S. PATENT DOCUMENTS

| | | | | |
|---|---|---|---|---|
| RE31,285 E | * | 6/1983 | van Turnhout | B01D 39/163 264/230 |
| 4,513,049 A | * | 4/1985 | Yamasaki | B32B 27/08 307/400 |
| 4,874,399 A | * | 10/1989 | Reed | B01D 39/1623 55/527 |
| 4,874,659 A | * | 10/1989 | Ando | B01D 39/083 128/205.29 |
| 4,886,527 A | * | 12/1989 | Fottinger | B01D 39/083 307/400 |
| 5,110,620 A | | 5/1992 | Tani et al. | |
| 5,112,677 A | | 5/1992 | Tani et al. | |
| 5,256,176 A | * | 10/1993 | Matsuura | B01D 39/083 204/165 |
| 5,409,766 A | | 4/1995 | Yuasa et al. | |
| 5,874,373 A | * | 2/1999 | Pryne | B32B 5/26 28/107 |
| 6,196,708 B1 | * | 3/2001 | Rogers | B01D 39/1692 210/500.36 |
| 6,280,824 B1 | | 8/2001 | Insley et al. | |
| 6,420,024 B1 | * | 7/2002 | Perez | B01D 39/1623 428/359 |
| 6,454,839 B1 | | 9/2002 | Hagglund et al. | |
| 6,471,746 B2 | | 10/2002 | Hagglund et al. | |
| 6,582,113 B2 | * | 6/2003 | Rogers | B01D 39/1692 210/500.36 |
| 6,749,669 B1 | | 6/2004 | Griffiths et al. | |
| 6,752,889 B2 | | 6/2004 | Insley et al. | |
| 6,773,488 B2 | * | 8/2004 | Potter | B03C 3/60 55/DIG. 39 |
| 6,846,449 B2 | * | 1/2005 | Martin | B29C 71/0081 264/466 |
| 6,858,551 B1 | * | 2/2005 | Turkevich | B01D 39/1623 128/205.27 |
| 6,893,990 B2 | * | 5/2005 | Myers | B01D 39/083 307/400 |
| 7,014,688 B2 | | 3/2006 | Griffiths et al. | |
| 7,753,981 B2 | * | 7/2010 | Kawano | B01D 46/0002 210/493.1 |
| 7,951,229 B2 | * | 5/2011 | Ptak | B01D 46/0001 55/497 |
| 8,105,425 B2 | * | 1/2012 | Ptak | B01D 46/0001 264/479 |
| 8,404,087 B2 | * | 3/2013 | Yoshitsugi | G02F 1/167 204/157.63 |
| 8,709,138 B2 | * | 4/2014 | Lazarevic | B01D 39/163 442/414 |
| 8,790,567 B2 | * | 7/2014 | Uchida | H01G 7/023 204/157.63 |
| 8,932,703 B2 | * | 1/2015 | Koike | B32B 7/02 428/195.1 |
| 9,044,916 B2 | * | 6/2015 | Koike | B32B 7/06 |
| 2002/0005116 A1 | | 1/2002 | Hagglund et al. | |
| 2003/0118781 A1 | | 6/2003 | Insley et al. | |
| 2004/0226448 A1 | | 11/2004 | Griffiths et al. | |
| 2013/0170015 A1 | * | 7/2013 | Yoshitsugi | G02F 1/167 359/296 |
| 2015/0360159 A1 | * | 12/2015 | Lee | D04H 1/4391 210/505 |
| 2017/0113170 A1 | * | 4/2017 | Kitagawa | B01D 39/1623 |

FOREIGN PATENT DOCUMENTS

| | | | | |
|---|---|---|---|---|
| JP | S56-10312 A | 2/1981 | | |
| JP | S56-10314 A | 2/1981 | | |
| JP | S62-110720 A | 5/1987 | | |
| JP | 62197118 A | * 8/1987 | ............... | B03C 3/28 |
| JP | H01-199614 A | 8/1989 | | |
| JP | 4-161208 A | 6/1992 | | |
| JP | H06-57417 U | 8/1994 | | |
| JP | H07-213945 A | 8/1995 | | |
| JP | 2536584 B2 | * 9/1996 | ............ | B01D 39/14 |
| JP | 2000-288322 A | 10/2000 | | |
| JP | 2001-210549 A | 8/2001 | | |
| JP | 2002-102624 A | 4/2002 | | |
| JP | 2002-102625 A | 4/2002 | | |
| JP | 2002-535125 A | 10/2002 | | |
| JP | 2003003367 A | * 1/2003 | ............ | B01D 39/14 |
| JP | 2003-512155 A | 4/2003 | | |
| JP | 2003-320602 A | 11/2003 | | |
| JP | 2010-99657 A | 5/2010 | | |
| WO | 2000/44472 A | 8/2000 | | |

OTHER PUBLICATIONS

International Preliminary Report on Patentability issued with respect to application No. PCT/JP2014/077474, dated Apr. 19, 2016.
Office Action issued in Chinese Counterpart Patent Appl. No. 201480056580.4, dated Jan. 20, 2017, with English translation.
Extended European Search Report in respect to European Application No. 14853452.2, dated May 3, 2017.
Chinese Office Action in respect to Chinese Application No. 201480056580.4, dated Sep. 4, 2017, with English Translation.
Japanese Office Action issued with respect to application No. 2014-210856, dated Dec. 19, 2017, with machine translation.

* cited by examiner

FILTER

TECHNICAL FIELD

The present invention relates to a filter using an electret sheet. More particularly, the present invention relates to an electrification-type air filtering material having low pressure loss and excellent dust- and dirt-filtering efficiency.

BACKGROUND ART

There are conventionally known structures having voids obtained by consecutively folding and laminating a film so as to form the film into a specific three-dimensional structure. There are also known electret filters using the principle of electrifying (electretizing) the film of such a structure and adsorbing dust with an electrostatic force when air containing dust is circulated into the voids thereof. For example, it is disclosed in Patent Documents 1 and 2 that electret filters are obtained by consecutively folding an electretized film and laminating the film in the thickness direction.

These electret filters have the advantage that the pressure loss is low. However, since the amount of electrification of these electretized filters is low, the volume charge density of the space enclosed by the film is low, so it has not been possible to increase the dust-collecting capability. In addition, the dissipation of the amount of electric charge (electrification amount) accumulated in the film is fast, which has the drawback that a stable collecting capability over a long period of time cannot be achieved.

Further, it is disclosed in Patent Document 3 that an electret filter is obtained by imparting electret characteristics to the outside wall of an arrayed body having a channel enclosed by a plastic wall. However, when performing electrification treatment for imparting electret characteristics, treatment is performed by filling the outer surfaces of the sheet material with an electrically conductive liquid which connects the groove inner part to the ground potential and the outer surfaces of the sheet material to a high negative and positive potential, respectively, so an apparatus for electrification is required, and a high voltage is applied by this apparatus, which carries a risk of electric leakage or electric shock due to insulation breakdown.

In addition, Patent Documents 4 and 5 disclose filtration devices in the form of a structure having voids due to a film having a structure with a high aspect ratio structure for forming flow channels, wherein the film is electrified. Although these filtration devices have the advantage that the collection efficiency improves due to a high surface area, there are undulations on the film surface, so the workability is diminished when forming the film into a structure, and the space volume of the filter decreases, which has the drawback that the pressure loss increases. In addition, since there are no voids inside the film, the electrification dissipation rate is high, which has a risk that the sustainability as an electret filter may be diminished.

On the other hand, Patent Document 6 discloses a sheet formed by laminating (1) a film prepared by processing a film having a specific porosity and compression height into a wave shape having a wavelength of from 0.5 to 60 mm and a height of from 1 to 20 mm of the highest and lowest parts of the wave and (2) a thermoplastic resin film on at least one surface thereof; and a structure formed by laminating a plurality of these sheets. Such a structure has a possibility that the film surface may be electrified by friction associated with the circulation of air, but even when electrified, the function as a filter is insufficient since the charge density of the film surface is small.

In addition, Patent Document 7 discloses a filter with a trapezoidal corrugated shape comprising a first surface electrified positively and a second surface electrified negatively opposite the first surface. However, there is no specific description of a method of increasing the amount of electrification charge, and an electret filter obtained with the production method of this document has a high electrification dissipation rate, which has a risk that the sustainability as an electret filter may be diminished.

CITATION LIST

Patent Literature

Patent Document 1: Japanese Unexamined Patent Application Publication No. S56-010312
Patent Document 2: Japanese Unexamined Patent Application Publication No. S56-010314
Patent Document 3: Japanese Unexamined Patent Application Publication No. 2010-099657
Patent Document 4: Japanese Translation of PCT International Publication No. 2002-535125
Patent Document 5: Japanese Translation of PCT international Publication No. 2003-512155
Patent Document 6: Japanese Unexamined Patent Application Publication No. 2003-320602
Patent Document 7: Japanese Unexamined Patent Application Publication No. 2000-288322

SUMMARY OF INVENTION

Technical Problem

An object of the present invention is to provide a low pressure loss filter having a high dust- and dirt-collecting capability and excellent workability and sustainability of collecting capability.

Solution to Problem

As a result of conducting dedicated research in light of the problem described above, the present inventors discovered that the problem described above can be solved by using a specific electret sheet and processing the sheet into a structure having a specific channel cross-sectional ratio and a specific volume charge density, and thereby completed the present invention.

That is, the present invention is as follows.

(1) A filter having air channels formed using an electret sheet; a porosity of the electret sheet being from 1 to 70%; an air channel cross-sectional ratio of the filter being from 10 to 99%; and a volume charge density of the filter being from 10 to 5000 nC/cm$^3$.

(2) The filter described in (1) above, wherein the electret sheet contains a thermoplastic resin.

(3) The filter described in (2) above, wherein the thermoplastic resin contains a polyolefin-based resin.

(4) The filter described in (3) above, wherein the polyolefin-based resin contains a polypropylene-based resin.

(5) The filter described in (4) above, wherein the electret sheet contains from 50 to 98 mass % of a polypropylene-based resin, from 1 to 49 mass % of a polyethylene-based resin, and from 1 to 49 mass % of at least one of an inorganic fine powder and an organic filler.

(6) The filter described in any one of (1) to (5) above, wherein the electret sheet is stretched in at least one axial direction.

(7) The filter described in any one of (1) to (6) above, wherein a dielectric constant of the electret sheet is from 1.1 to 2.5.

(8) The filter described in any one of (1) to (7) above, wherein the electret sheet comprises a sheet electretized by a DC corona discharge.

(9) The filter described in any one of (1) to (8) above, wherein an arithmetic average surface roughness (SRa) of the electret sheet is from 0.1 to 5 µm.

(10) The filter described in any one of (1) to (9) above, wherein the air channels are formed by alternately laminating the electret sheet processed into a wave shape by corrugation and the electret sheet with a flat shape not subjected to corrugation and then adhering or fusing the sheets.

(11) An electret sheet used in the filter described in any one of (1) to (10) above.

Advantageous Effects of Invention

According to the present invention, it is possible to provide a low pressure loss filter having a high collection efficiency for dust, dirt, and the like and highly sustainable collecting capability.

In addition, according to the present invention, it is possible to provide a filter having excellent workability into a structure by using an electret sheet having a typical thermoplastic resin not containing a compound with a large dipole moment such as a fluorine-containing resin or an azo compound as a material.

DESCRIPTION OF EMBODIMENTS

The present invention will be described in detail hereinafter, but the explanations of constituent elements given below are examples (representative examples) of embodiments of the present invention, and the present invention is not specified by the content of these explanations.

Here, the notation "the numeric value to the other numeric value" refers to a range including the numbers stated before and after a "to" as the respective minimum and maximum values.

In addition, "(meth)acrylates" refers to both acrylates and methacrylates. This also holds for (meth)acrylic acid derivatives.

In this specification, it is to be understood that "mass" refers to "weight".

[Filter]

The filter of the present invention is one in which air channels are formed using an electret sheet, wherein the air channel cross-sectional ratio is from 10 to 99%, and the volume charge density is from 10 to 5000 nC/cm$^3$.

(Channel Structure)

The shape of the channel structure of the filter is not limited as long as the air channels are formed by processing an electret sheet and the air channel cross-sectional ratio is from 10 to 99%. Of these structures, a channel structure obtained by alternately laminating an electret sheet processed into a wave shape by corrugation and an electret sheet with a flat shape not subjected to corrugation and then adhering or fusing the sheets is preferable because the structure is strong, the structure is unlikely to collapse even when the amount of electrification of the electret sheet is increased, and that production is simple.

Figure 4:
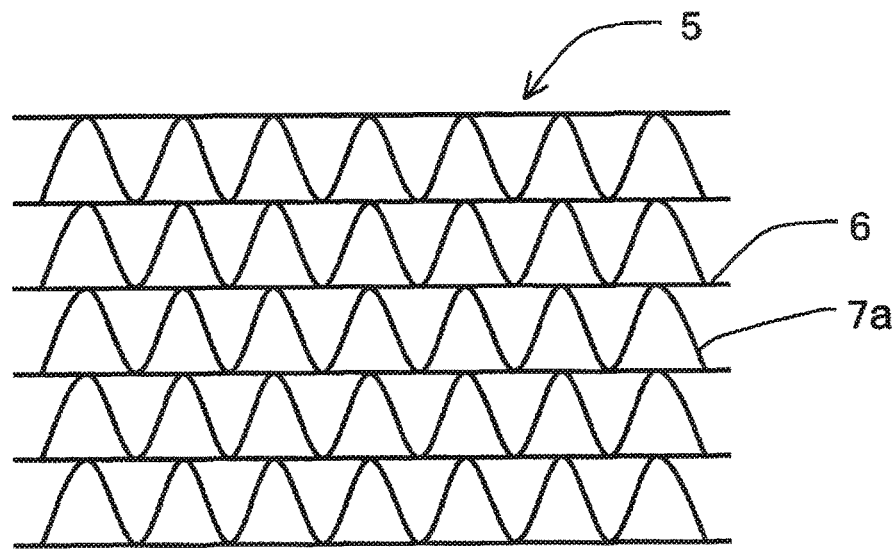
FIG. 4 is an aspect of the cross section of the filter of the present invention.
Figure 6:
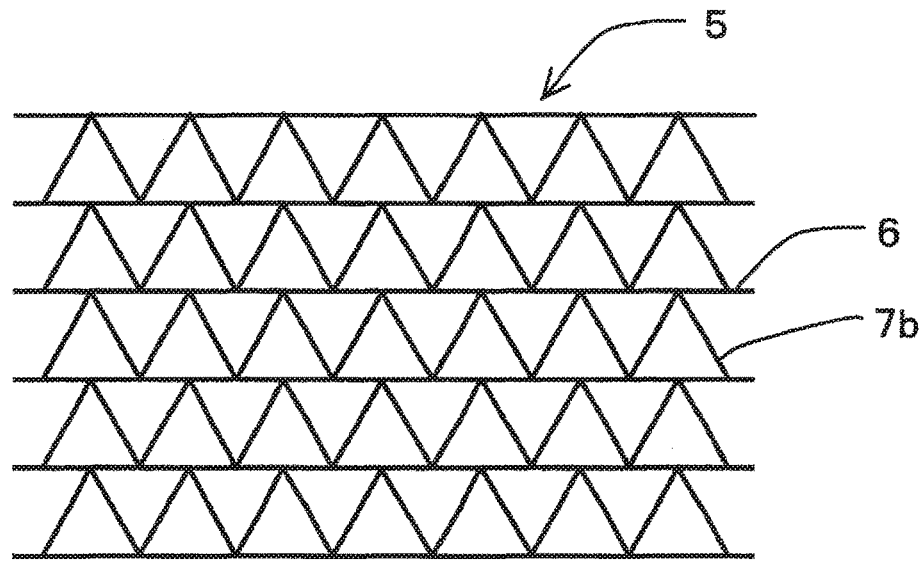
FIG. 6 is another aspect of the cross section of the filter of the present invention.
Figure 8:
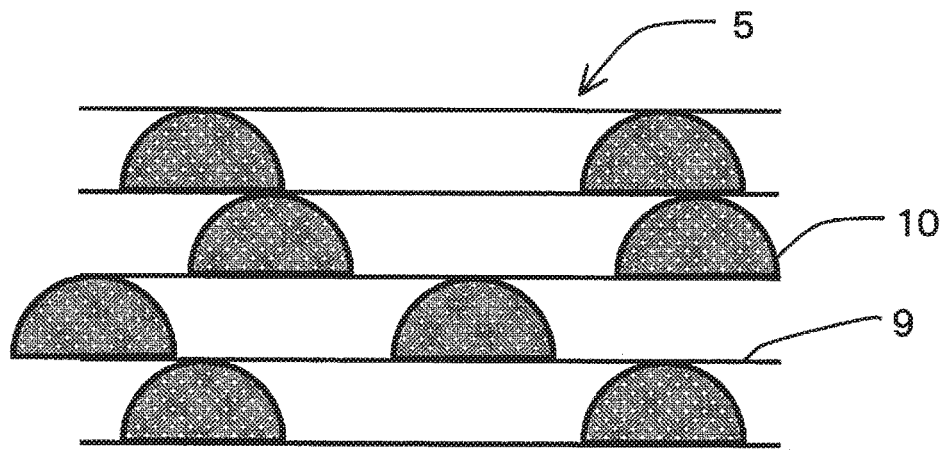
FIG. 8 is another aspect of the cross section of the filter of the present invention.

In addition, the structure may have a shape in which sheets of the same shape processed into a wave shape or a pleated shape are laminated and the contact points or contact surfaces of both sheets are adhered to one another, and a specific example is a structure in which the cross-sectional shape of the channels forms a hexagonal honeycomb core. Further, as illustrated in FIGS. 4 and 6, the filter may be a filter 5 having a shape in which electret sheets 7a and 7b processed into a wave shape or a pleated shape and an electret sheet 6 with a flat shape not subjected to such processing are alternately laminated and the contact points or contacts surfaces of both sheets are adhered to one another, and specific examples include a structure having a cross-sectional shape such as a feather core processed into a pleated shape, a corrugated core processed into a wave shape, or a roll core processed into a circular shape. In addition, as illustrated in FIG. 8, the filter may have undulations (protruding structure) such as a pillar or a rib structure between two electret sheets 9. In this case, the pillar structure 10 or rib structure preferably consists of an insulating material from the perspective of reducing the electrification dissipation rate of the electret sheet 9. In addition, the height of such a pillar structure 10 or rib structure is preferably from 1 to 10 mm from a cross-sectional observation with a microscope from the perspective of securing air channels.

The pattern constituting the cross-sectional shape of such channels (for example, a hexagonal shape in a honeycomb structure) may be arranged at equal intervals with a constant pitch or may be arranged at random. When such a pattern is arranged with a constant pitch, the pitch is preferably in the range of from 0.5 to 10 mm, more preferably in the range of from 0.7 to 5 mm, and particularly preferably in the range of from 1 to 3 mm from the perspective of the workability into a filter and the dust- and dirt-collecting efficiency.

(Channel Cross-Sectional Ratio)

The air channel cross-sectional ratio of the filter is the ratio occupied by air channels with respect to the cross section of the filter. Therefore, when the value is lower, the strength of the filter increases, which simultaneously yields resistance with respect to the circulation of air and tends to cause an increase in pressure loss.

Specifically, the air channel cross-sectional ratio is determined by dividing the cross-sectional area of the sheet base material, which is the product of the sheet base material thickness and the length of the sheet base material used for channel forming, by the cross-sectional area of the filter. This value can also be determined from cross-sectional image observations.

The air channel cross-sectional ratio is not less than 10%, preferably not less than 30%, and more preferably not less than 50% from the perspective of reducing the pressure loss with respect to the circulation of air. On the other hand, the air channel cross-sectional ratio is not more than 99%, preferably not more than 97%, and more preferably not more than 95% from the perspective of the strength of the filter.

(Volume Charge Density)

The volume charge density of the filter refers to the total amount of charge occupying the space volume of the filter. A higher value indicates a higher dust- or dirt-collecting capability.

Specifically, the volume charge density of the filter is determined by dividing the amount of charge of the sheet base material of the filter by the space volume formed by the sheet base material. The amount of charge of the sheet base material of the filter may be determined using actual measurements, and the space volume may be determined logically from the filter shape or may be determined from the density of the filter.

For example, when the space volume is determined logically from the filter shape, the unit space is defined as a cube with a vertical dimension of 1 cm, a horizontal dimension of 1 cm, and a height of 1 cm. Next, the total length Ls (cm/cm$^2$) of the electret sheet present per square with a vertical dimension of 1 cm and a horizontal dimension of 1 cm of the cross section cut perpendicularly to the channels of the electret sheet is determined by measurement or calculation from the filter shape.

As a result, the total area Ss (cm$^2$/cm$^3$) of the electret sheet present per unit space volume is determined by multiplying the total length Ls of the electret sheet present per respective cross-sectional square (unit area) by the depth of the unit space serving as the width of the sheet, so Ss and Ls are the same values, as expressed by the following formula.

$$Ss(\text{cm}^2/\text{cm}^3) = Ls(\text{cm}/\text{cm}^2) \times 1 \text{ cm}/1 \text{ cm}$$
$$= Ls(\text{cm}/\text{cm}^2)$$

On the other hand, the amount of charge Qs (nC/cm$^2$) per unit area of the electret sheet is determined by actual measurement.

Accordingly, the amount of charge Qa (nC/cm$^3$) of the electret sheet present per unit space—that is the volume charge density—is expressed by the following formula.

$$Qa(\text{nC}/\text{cm}^3) = Ss(\text{cm}^2/\text{cm}^3) \times Qs(\text{nC}/\text{cm}^2)$$
$$= Ls(\text{cm}/\text{cm}^2) \times Qs(\text{nC}/\text{cm}^2)$$

As described above, the volume charge density can be determined from the product of the total length Ls of the electret sheet per unit area of the cross section and the amount of charge Qs per unit area of the electret sheet.

Here, when the filter consists of multiple types of electret sheets—for example, when the filter consists of 1, 2, . . . n types of electret sheets—the amount of charge Qa of the electret sheet present per unit space is expressed as the sum of the amounts of charge Qa1, Qa2, . . . Qan per unit space of each electret sheet.

When the volume charge density of the filter is higher, the dust-collecting efficiency of the filter becomes higher, and the length of the air channels (depth/thickness of the filter) can be made short as long as the collection efficiency required of the filter is constant. On the other hand, the life of the filter can be made long as long as the length of the air channels is constant.

The volume charge density is not less than 10 nC/cm$^3$, preferably not less than 50 nC/cm$^3$, more preferably not less than 80 nC/cm$^3$, and particularly preferably not less than 110 nC/cm$^3$ from the perspective of increasing the collection efficiency. On the other hand, due to restrictions of the amount of charge that the sheet base material can possess, the volume charge density is not more than 5000 nC/cm$^3$, but the volume charge density is preferably not more than 2000 nC/cm$^3$, more preferably not more than 1000 nC/cm$^3$, and particularly preferably not more than 500 nC/cm$^3$ from the perspective of the ease of producing the sheet base material.

[Electret Sheet]

The electret sheet that can be used in the present invention at least has a porosity of from 1 to 70%, and the porosity is preferably from 5 to 60% and more preferably from 25 to 40%.

In addition, the electret sheet that can be used in the present invention is preferably formed from a film containing a thermoplastic resin. The film containing a thermoplastic resin has a certain degree of insulation, and a charge can be stably held in the surface or interior thereof by performing electrification treatment. Hereafter, in the present invention, a film containing a thermoplastic resin will be referred to as a resin film layer (A), and a film subjected to electrification treatment will be referred to as an electret sheet.

[Resin Film Layer (A)]

As described above, the resin film layer (A) of the present invention serves as an electret sheet retaining a charge on the surface or interior thereof due to electrification treatment, and in a filter formed using the electret sheet, dust, dirt, and the like can be adsorbed to the surface of the electret sheet by means of electrostatic adsorptive force.

The resin film layer (A) preferably contains a thermoplastic resin. Of these, it is preferable to use a thermoplastic resin having excellent insulation so that it becomes easy to retain a charge accumulated therein.

(Thermoplastic Resin)

The type of the thermoplastic resin used in the resin film layer (A) is not particularly limited. For example, it is possible to use polyolefin-based resins such as high-density polyethylene, medium-density polyethylene, low-density polyethylene, propylene-based resins, and polymethyl-1-pentene; functional group-containing polyolefin-based resins such as ethylene-vinylacetate copolymers, ethylene-acrylic acid copolymers, maleic acid-modified polyethylene, and maleic acid-modified polypropylene; polyamide-based resins such as nylon-6 and nylon-6,6; thermoplastic polyester-based resins such as polyethylene terephthalate or copolymers thereof, polybutylene terephthalate, and aliphatic polyesters; polycarbonate-based resins; and polystyrene-based resins such as atactic polystyrene and syndiotactic polystyrene. Of these thermoplastic resins, it is preferable to use a polyolefin-based resin or a functional group-containing polyolefin-based resin from the viewpoint of excellent insulation and workability.

More specific examples of polyolefin-based resins include homopolymers of olefins such as ethylene, propylene, butylene, hexene, octene, butadiene, isoprene, chloroprene, methyl-1-pentene, and cyclic olefins, and copolymers comprising two or more types of these olefins.

More specific examples of functional group-containing polyolefin-based resins include copolymers of the aforementioned olefins and copolymerizable functional group-containing monomers. Examples of such functional group-containing monomers include styrenes such as styrene and α-methylstyrene; vinyl carboxylate esters such as vinyl acetate, vinyl alcohol, vinyl propionate, vinyl butyrate, vinyl pivalate, vinyl caproate, vinyl laurate, vinyl stearate, vinyl benzoate, vinyl butylbenzoate, and vinyl cyclohexanecarboxylate; (meth)acrylic acid esters such as acrylic acid, methacrylic acid, methyl (meth)acrylate, ethyl (meth)acrylate, butyl (meth)acrylate, hexyl (meth)acrylate, octyl (meth) acrylate, 2-ethylhexyl (meth)acrylate, stearyl (meth)acrylate, benzyl (meth)acrylate, cyclohexyl (meth)acrylate, isobornyl (meth)acrylate, dicyclopentanyl (meth)acrylate, (meth)acrylamide, and N-methylol (meth)acrylamide; and vinyl ethers such as methyl vinyl ether, ethyl vinyl ether, propyl vinyl ether, butyl vinyl ether, cyclopentyl vinyl ether, cyclohexyl vinyl ether, benzyl vinyl ether, and phenyl vinyl ether. One type or two or more types may be appropriately selected as necessary from these functional group-containing monomers and the copolymerized material thereof can be used.

Further, these polyolefin-based resins and functional group-containing polyolefin-based resins may also be used after being graft-modified as necessary.

A conventionally known method may be used for graft modification. A specific example is graft modification with an unsaturated carboxylic acid or a derivative thereof. Examples of the unsaturated carboxylic acids include acrylic acid, methacrylic acid, maleic acid, fumaric acid, itaconic acid, and the like. In addition, examples of derivatives of the unsaturated carboxylic acids described above include acid anhydrides, esters, amides, imides, metal salts, and the like. Specific examples of derivatives of the unsaturated carboxylic acids described above include maleic anhydride, itaconic anhydride, citraconic anhydride, methyl (meth) acrylate, ethyl (meth)acrylate, butyl (meth)acrylate, glycidyl (meth)acrylate, monoethyl maleate esters, diethyl maleate esters, monomethyl fumarate esters, dimethyl fumarate esters, monomethyl itaconate esters, diethyl itaconate esters, (meth)acrylamide, monoamide maleate, diamide maleate, maleic acid-N-monoethylamide, maleic acid-N,N-diethylamide, maleic acid-N-monobutylamide, maleic acid-N,N-dibutylamide, monoamide fumarate, diamide fumarate, fumaric acid-N-monoethylamide, fumaric acid-N,N-diethylamide, fumaric acid-N-monobutylamide, fumaric acid-N,N-dibutylamide, maleimide, N-butylmaleimide, N-phenylmaleimide, sodium (meth)acrylate, and potassium (meth) acrylate. A graft-modified product is formed by graft-modifying the graft monomer in an amount of typically from 0.005 to 10 mass % and preferably from 0.01 to 5 mass % with respect to the polyolefin-based resin and the functional group-based polyolefin-based resin.

As the thermoplastic resin contained in the resin film layer (A), one type may be selected from the thermoplastic resins described above and used alone, or two or more types may be selected and used in combination.

Further, of these polyolefin-based resins, propylene-based resins are preferable from the perspectives of insulation, workability, moisture resistance, chemical resistance, and cost. As such propylene-based resins, propylene homopolymers of a polypropylene exhibiting isotactic or syndiotactic or various degrees of stereoregularity, or copolymers of primarily propylene with an α-olefin such as ethylene, 1-butene, 1-hexene, 1-heptene, and 4-methyl-1-pentene are preferably used as a main component. This copolymer may be a bipolymer, a terpolymer, or a higher polymer, and it may also be a random copolymer or a block copolymer. From 2 to 25 mass % of a resin having a lower melting point than the propylene homopolymer is preferably compounded with the propylene-based resin from the perspective of sheet formability. An example of a resin with such a low melting point is a high-density or low-density polyethylene.

The compounding ratio of the thermoplastic resin in the resin film layer (A) is preferably from 50 to 99 mass %, more preferably from 51 to 99 mass %, and even more preferably from 60 to 95 mass % based on the total mass of the thermoplastic resin. When the compounding ratio of the thermoplastic resin is not less than 50 mass %, the resin film layer (A) can be formed easily, and the resulting resin film layer (A) easily retains a charge due to the insulation of the thermoplastic resin.

The compounded composition in the resin film layer (A) even more preferably contains from 50 to 98 mass % of a polypropylene-based resin and from 1 to 49 mass % of a polyethylene-based resin and particularly preferably contains from 50 to 96 mass % of a polypropylene-based resin and from 3 to 29 mass % of a polyethylene-based resin.

Figure 1:
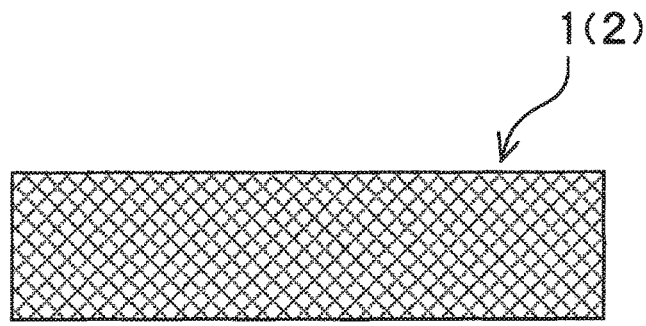
FIG. 1 is an aspect of a resin film layer (A) used in the filter of the present invention.

As illustrated in FIG. 1, the filter of the present invention may comprise only a single layer of a resin film layer (A) 1.

Figure 2:
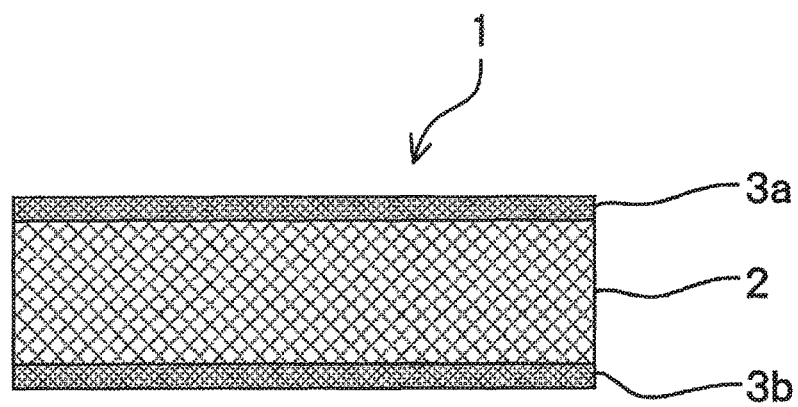
FIG. 2 is another aspect of a resin film layer (A) used in the filter of the present invention.

In addition, as one aspect of the present invention, when a filter comprising a structure formed by laminating a plurality of electret sheets is obtained, the filter can be produced easily by heat bonding as long as the electret sheets have heat sealability. In order to impart heat sealability to the electret sheets, as illustrated in FIG. 2, there is a method of using a multilayer structure of two layers or three or more layers formed from a base layer 2 and surface layers 3a and 3b as the resin film layer (A) 1 and providing the surface layers 3a and 3b having a melting point lower than the melting point of the base layer 2 on one or both surfaces of the base layer 2. Alternative methods include a method of forming a resin film layer (A) and then laminating a film of a resin having a inciting point lower than the melting point of a thermoplastic resin on at least one surface of the resin film layer (A) by means of dry lamination or melt-extrusion lamination, and a method of applying a coating solution containing a resin having a melting point lower than the melting point of a thermoplastic resin to at least one surface of the resin film layer (A).

Examples of resins suitable for imparting heat sealability include low-density polyethylenes, ethylene-vinylacetate copolymers, metal salts of ethylene-(meth)acrylic acid copolymers, modified polyolefin-based resins such as chlorinated polyethylenes and chlorinated polypropylenes, polyamide-based resins, polybutyral-based resins, and urethane-based resins.

(Inorganic Fine Powder and Organic Filler)

Figure 3:
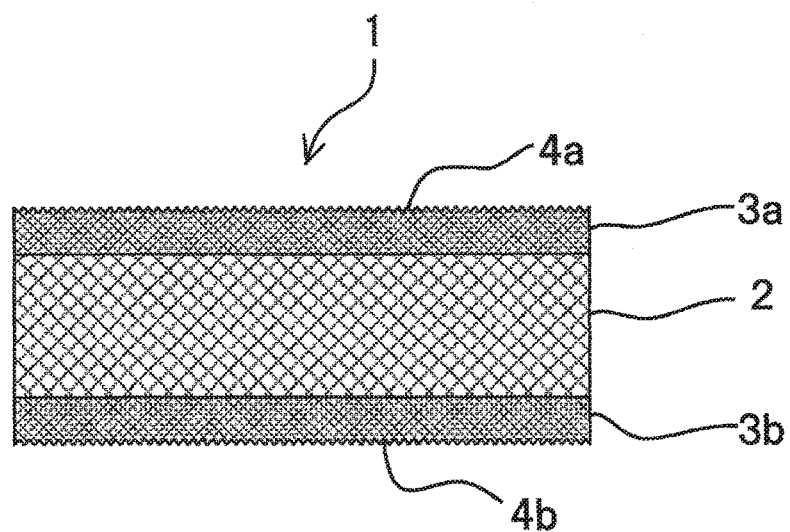
FIG. 3 is another aspect of a resin film layer (A) used in the filter of the present invention.

At least one of an inorganic fine powder and an organic filler may be added to the resin film layer (A). By adding an inorganic fine powder or an organic filler, voids (pores) are formed in the resin film layer (A), and the interface (surface area) between the resin and air is increased, which may enhance the electrifying capability of the resin film layer (A). In addition, as illustrated in FIG. 3, undulations (protruding structures) 4a and 4b originating from the inorganic fine powder or the organic filler may be formed on the surface of the resin film layer (A) so as to roughen the surface of the resin film layer (A), and increasing the surface area of the resin film layer (A) leads to an increase in the adsorption area of the electret sheet, which may enhance the collection efficiency of the filter as a result.

The compounding ratio of the inorganic fine powder and the organic filler in the resin film layer (A) is preferably from 1 to 49 mass % and more preferably from 5 to 40 mass % in terms of the total amount. When the compounding ratio of the inorganic fine powder and the organic filler is not less than 1 mass %, voids can be easily formed in the resin film layer (A), whereas when the compounding ratio is not more than 49%, the amount of electrification of the resulting resin film layer (A) is easy to control, and the collection efficiency of the filter is easy to maintain, which is preferable.

When an inorganic fine powder is added to the resin film layer (A), the particle having the volume average particle size measured by a particle size analyzer using laser diffraction being preferably from 0.01 to 15 μm, more preferably from 0.1 to 10 μm, and even more preferably from 0.5 to 5 μm, is used. An inorganic fine powder having such a volume average particle size is preferable because it is easy to form voids inside in step with the stretching described below.

Specific examples of inorganic fine powders that may be used include calcium carbonate, calcined clay, silica, diatomaceous earth, kaolin, talc, titanium oxide, barium sulfate, alumina, zeolite, mica, sericite, bentonite, sepiolite, vermiculite, dolomite, wollastonite, and glass fibers.

When an organic filler is added, it is preferable to select a resin of a different type than the thermoplastic resin serving as the main component of the resin film layer (A). For example, when the thermoplastic resin is a polyolefin-based resin, a polymer such as polyethylene terephthalate, polybutylene terephthalate, polycarbonate, nylon-6, nylon-6,6, cyclic polyolefin, polystyrene, and polymethacrylate may be used as the organic filler, wherein the organic filler has a higher melting point (for example, from 170 to 300° C.) or glass transition temperature (for example, from 170 to 280° C.) than the melting point of a polyolefin-based resin, and is incompatible.

A thermal stabilizer (antioxidant), light stabilizer, dispersant, lubricant, or the like may be added to the resin film layer (A) as necessary. When a thermal stabilizer is added, it is ordinarily added within the range of from 0.001 to 1 mass %. Specifically, sterically hindered phenol-based, phosphorus-based, and amine-based stabilizers or the like may be used. When a light stabilizer is added, it is ordinarily used within the range of from 0.001 to 1 mass %. Specifically, sterically hindered amine-based, benzotriazole-based, and benzophenone-based light stabilizers or the like may be used. A dispersant or lubricant is used for the purpose of dispersing the inorganic fine powder, for example. The amount used is ordinarily within the range of from 0.01 to 4 mass %. Specifically, silane coupling agents, higher fatty acids such as oleic acid or stearic acid, metal soaps, polyacrylic acids, polymethacrylic acids, or salts thereof may be used.

The thickness of the resin film layer (A) is preferably from 20 to 300 μm, more preferably in the range of from 30 to 250 μm, and even more preferably in the range of from 40 to 200 μm. When the thickness of the resin film layer (A) is less than 20 μm, the strength of the resulting filter is low, which tends to cause the filter to collapse easily under wind pressure or the like and tends to make it difficult to maintain the shape thereof. In addition, when electret sheets are processed to form a filter, sheets may stick to one another or the sheets and the processing machine may stick to one another due to electrification, may diminish operability. On the other hand, when the thickness of the resin film layer (A) exceeds 300 μm, the channel cross-sectional ratio tends to become small in a filter having channels formed using an electret sheet, and the rigidity of the resin film layer (A) becomes too high, which tends to make it difficult to form a filter by processing the electret sheet.

(Antistatic Layer)

The resin film layer (A) constituting the filter may be provided with an antistatic layer on one surface thereof. Providing an antistatic layer on the resin film layer (A) is preferable because it is possible to suppress troubles of electret sheets sticking to one another or dust and dirt adhering to the filter prior to processing in the production process of the filter.

When an antistatic layer is provided, other members should be attached to the surface of the resin film layer (A) having the antistatic layer in the filter production process described below so that the surface having the antistatic layer is not exposed to the channels of the final filter.

The antistatic layer may be provided by applying a coating having an antistatic agent described below to one surface of the resin film layer (A) and drying the coating. In addition, when the resin film layer (A) has a multilayer structure comprising two or more layers, the antistatic agent described below should be kneaded into the surface layer of one surface thereof. Further, a resin film having an antistatic property may be laminated and provided as an antistatic layer on one surface of the resin film layer (A).

Examples of antistatic agents include low-molecular-weight organic compound-based antistatic agents such as monoglyceride stearate, alkyl diethanolamine, sorbitan monolaurate, alkyl benzenesulfonate, and alkyl diphenyl ether sulfonate; electrically conductive inorganic fillers such as ITO (indium-doped tin oxide), ATO (antimony-doped tin oxide), and graphite whiskers; so-called electronically conductive polymers exhibiting electrical conductivity due to pi electrons in the molecular chains such as polythiophene, polypyrrole, and polyaniline; non-ionic polymer-based antistatic agents such as polyethylene glycol and polyoxyethylene diamine; quaternary ammonium salt-based copolymers such as polyvinylbenzyl trimethylammonium chloride and polydimethylamino ethylmethacrylate; and polymers having an antistatic function such as alkali metal-containing polymers including alkali metal ion adducts to alkylene oxide group and/or hydroxyl group-containing polymers.

Of these, quaternary ammonium salt-based copolymers or alkali metal salt-containing polymers are more preferable in that they have superior antistatic property.

When an antistatic layer is provided by applying a coating containing an antistatic agent and then drying the coating, the coating preferably contains a polymer binder from the perspective of preventing dropoff from the resin film layer (A).

Examples of polymer binders include polyethyleneimine-based polymers such as polyethyleneimine, alkyl-modified polyethyleneimine having from 1 to 12 carbon atoms, poly(ethyleneimine-urea), ethyleneimine adducts of poly(ethyleneimine-urea), polyaminepolyamide, ethyleneimine adducts of polyaminepolyamide, and epichlorohydrin adducts of polyaminepolyamide; acrylic acid ester-based polymers such as acrylic acid ester copolymers, methacrylic acid ester copolymers, acrylic acid amide-acrylic acid ester copolymers, acrylic acid amide-acrylic acid ester-methacrylic acid ester copolymers, polyacrylamide derivatives, and oxazoline group-containing acrylic acid ester-based polymers; radical polymer-based polymers such as polyvinylpyrrolidone, vinylacetate resins, ethylene-vinylacetate copolymers, vinyl chloride resins, vinyl chloride-vinylacetate copolymer resins, vinylidene chloride resins, vinyl chloride-vinylidene chloride copolymer resins, chlorinated ethylene resins, chlorinated propylene resins, butyral resins, styrene-acrylic copolymer resins, styrene-butadiene copolymer resins, and acrylonitrile-butadiene copolymers; condensation polymers such as polyethylene glycol and silicone resins; and natural polymers such as terpene resins, petroleum resins, cellulose acetate, and nitrocellulose resins.

Any one type of these polymer binders may be used alone, or two or more types may be mixed and used together. These polymer binders may be used in a form in which they are diluted in or dispersed with an organic solvent or water. Of these, urethane resins such as polyether urethane, polyester polyurethane, and acrylic urethane or acrylic acid ester copolymers are preferable because the affinity—that is, the compatibility—with antistatic agents is good and they are stable when mixed to form a coating, which makes them easy to be applied.

[Forming]

The resin film layer (A) is preferably formed by extrusion forming. Specific examples of this extrusion forming wherein the raw materials of the resin film layer (A) are melted and kneaded with an extruder set to a temperature higher than the melting point or the glass transition temperature of the resin film layer (A) and are then extruded into a sheet shape using a T-die, an I-die, or the like and cooled with a metal roller, a rubber roller, or a metal belt; and inflation forming, wherein a circular die is used to extrude the materials into a tube shape, and the materials are cooled with air or water while being expanded to a constant magnification by the internal pressure inside the tube.

When sheet forming is used for the forming of the resin film layer (A), the surface may be roughened using a cooling roller, such as a metal roller or a rubber roller, having an undulating shape (irregular shape), as illustrated in FIG. 3. The roughening of the surface of the resin film layer (A) increases the adsorption area of the electret sheet and enhances the collection rate of the filter.

[Multilayering]

The resin film layer (A) may have a two-layer structure or a multilayer structure comprising three or more layers.

The multilayering of the resin film layer (A) enables the improvement of the voltage resistance performance at the time of charge injection, the improvement of the capability to retain the injected charge and to prevent them from escaping to the outside, and the addition of various functions such as secondary processing suitability such as the adhesion of electret sheets to one another, and antistatic properties.

When the resin film layer (A) is formed with a multilayer structure, various conventionally known methods may be used, and specific examples thereof include a multilayer die method using a feed block and a multi-manifold, and an extrusion lamination method using a plurality of dies. In addition, a combination of a multilayer die and extrusion lamination may also be used.

(Stretching)

The resin film layer (A) preferably contains a resin film that has been stretched in at least one axial direction. The stretching of the resin film can be performed by any one of various methods that are ordinarily used.

When the resin film layer (A) has a multilayer structure, the resin films constituting the layer may include a laminated structure of films in which the numbers of stretching axes are uniaxial/uniaxial, uniaxial/biaxial, biaxial/uniaxial, uniaxial/uniaxial/biaxial, uniaxial/biaxial/uniaxial, biaxial/uniaxial/uniaxial, biaxial/biaxial/uniaxial, or biaxial/biaxial/biaxial.

Examples of stretching methods include machine-direction stretching utilizing the circumferential speed difference of a group of rollers, transverse-direction stretching using a tenter oven, sequential biaxial stretching which combines machine-direction stretching and transverse-direction stretching, rolling, simultaneous biaxial stretching by a combination of a tenter oven and a linear motor, and simultaneous biaxial stretching by a combination of a tenter oven and a pantograph. In addition, an example of an inflation film stretching method is simultaneous biaxial stretching using a tubular method.

The stretching ratio is not particularly limited, and is determined as appropriate in consideration of the characteristics of the thermoplastic resin used in the resin film layer (A). For example, when a propylene homopolymer or a copolymer thereof is used as the thermoplastic resin, if stretched in one direction, the stretching ratio is normally from 1.2 to 12 times, and preferably from 2 to 10 times, and if stretched biaxially, the area ratio is normally from 1.5 to 60 times, and preferably from 4 to 50 times. When the other thermoplastic resins are used, if stretched in one direction, the stretching ratio is normally from 1.2 to 10 times, and preferably from 2 to 5 times, and if stretched biaxially, the area ratio is from 1.5 to 20 times, and preferably from 4 to 12 times.

The temperature of stretching is determined within a conventionally known temperature range favorable for thermoplastic resins, from not less than the glass transition temperature of the thermoplastic resin primarily used in the resin film layer (A) to not greater than the melting point of the crystal portion. Specifically, when the thermoplastic resin of the resin film layer (A) is a propylene homopolymer (melting point from 155 to 167° C.), the temperature is from 100 to 166° C., and when the thermoplastic resin is a high-density polyethylene (melting point from 121 to 136° C.), the temperature is from 70 to 135° C., which is from 1 to 70° C. lower than the melting point. Furthermore, the stretching rate is preferably from 20 to 350 m/min.

[Physical Properties of Resin Film Layer (A) and Electret Sheet]

(Porosity)

The resin film layer (A) obtained as described above and an electret sheet obtained by subjecting this layer to the electrification treatment described below have fine voids inside the film. Specifically, the porosity calculated with the formula below is from 1 to 70%.

The electret sheet has voids inside, thus it is easy to retain a charge inside the electret sheet containing the voids, and the charge is unlikely to escape from the electret sheet, so it is easy to obtain a filter having a high collection efficiency and highly sustainable collecting capability.

In addition, when there are voids inside the electret sheet, this leads to a reduction in the density of the electret sheet, which is also preferable from the perspective of the weight reduction of the resulting filter.

$$\text{Porosity } (\%) = \frac{\rho_o - \rho}{\rho_o} \times 100 \quad \text{[Formula 1]}$$

($\rho_0$ is the true density of the resin film layer (A), and $\rho$ is the density of the resin film layer (A))

The porosity is preferably not less than 5% and more preferably not less than 25%. On the other hand, the porosity is preferably not more than 60% and more preferably not more than 40%. When the porosity exceeds 70%, the voids tend to communicate with one another, and the charge retention capability tends to be diminished. On the other hand, when the porosity is less than 1%, although there is a capacity to accumulate a charge, the sustainability of the filter performance may be diminished due to the accelerated dissipation rate of charge. By controlling the porosity to within the range described above, it is possible to obtain an electret sheet having the stable adsorptive force targeted by the present invention.

The true density $\rho_0$ of the resin film layer (A) is measured as follows: Heat-compressing the resin film layer (A) for not less than 3 minutes under a pressure of not less than 3 MPa using a compression forming machine set to a temperature from 10° C. to 150° C. higher than the melting point or the glass transition temperature of the thermoplastic resin used in the resin film layer (A); cooling the layer for not less than 3 minutes under a pressure of not less than 3 MPa with a compression forming machine set to not more than 25° C. so as to eliminate the voids inside the resin film layer (A); subsequently, adjusting the state for not less than 24 hours using an oven set to a temperature from 10° C. to 70° C. lower than the melting point or the glass transition temperature of the thermoplastic resin used in the resin film layer (A); then, adjusting the state for not less than 24 hours under environmental conditions of a temperature 23° C. and relative humidity 50%; the true density of the layer is measured in accordance with the method described in MS-K7112:1999.

The density of the resin film layer (A) is determined with the following calculation formula using the basis weight Wf (g/cm²) obtained by punching out the resin film layer (A) into a size of 10 cm×10 cm and measuring the weight, and the thickness Tf (cm) of the resin film layer (A) measured using the constant pressured thickness measuring instrument described in JIS-K7130:1999.

ρ=Wf/Tf

ρ: density (g/cm³) of the resin film layer (A)
Wf: basis weight (g/cm²) of the resin film layer (A)
Tf: thickness (cm) of the resin film layer (A)

(Dielectric Constant)

The electret sheet is a constituent member in the filter while simultaneously serving a role to hold the charge and to prevent them from escaping to the outside. The capacity to hold the charge inside can be explained by the dielectric constant ∈ of the electret sheet (ratio $\in_B/\in_0$ of the permittivity $\in_B$ of the electret sheet and the permittivity $\in_0$ of a vacuum).

Ordinarily, a lower dielectric constant of the electret sheet tends to yield a higher surface potential even with the same amount of charge, which tends to make it easier to obtain a filter having excellent dust- and dirt-collecting efficiency. The dielectric constant of the electret sheet can be controlled to within a lower, and desired range by including an insulating resin having a low permittivity or by forming voids inside the electret sheet.

The dielectric constant of the electret sheet is preferably within the range of from 1.1 to 2.5, more preferably from 1.1 to 2.2, even more preferably from 1.2 to 2.0, and particularly preferably from 1.25 to 1.9. When the dielectric constant of the electret sheet exceeds 2.5, the electret sheet cannot hold a charge for a long period of time, and the electrostatic adsorptive force of the filter tends to be diminished easily. On the other hand, an electret sheet having a dielectric constant of less than 1.1 can only be achieved when the porosity exceeds 70% due to the raw material structure of the product of the present invention, and the capacity of the filter to hold a charge tends to be diminished easily.

The method for measuring the dielectric constant of the electret sheet is selected in accordance with the measurement frequency range. When the measurement frequency is 10 Hz or lower, an ultralow frequency bridge is used; when the measurement frequency is from 10 Hz to 3 MHz, a transformer bridge is used; and when the measurement frequency exceeds 1 MHz, a parallel T-type bridge, a high-frequency Schering bridge, a Q-meter, a resonance method, a standing-wave method, or a cavity resonance method is used. In addition, the dielectric constant may be measured with an LCR meter or the like which measures a voltage/current vector with respect to the circuit part for an AC signal of the measurement frequency and calculates the electrostatic capacitance from this value.

As a measurement device for measuring the dielectric constant of the electret sheet, a measurement device with which a voltage of approximately 5 V can be applied and the arbitrary measurement frequency can be selected is preferable. With such a measurement device, the frequency dependence of a sample can be understood by varying the frequency, and this can be used as a measure of the proper usage range. Examples of such a measurement device include the "4192A LF IMPEDANCE ANALYZER" manufactured by Agilent Technologies, the "LCR Meter 4274A" manufactured by Yokogawa Electric Corporation, and the "HIOKI 3522 LCR High Tester" manufactured by Hioki E.E. Corporation.

In the measurement of the dielectric constant of the electret sheet, an electrode is first formed by applying an electrically conductive silver coating or performing vacuum metal deposition on the front and back of a sheet and using the electrode as a sample. Next, a voltage of 5 V is applied to the sample preferably under environmental conditions of a temperature 23° C. and a relative humidity of 50%. Measurements are taken at frequencies in the range of from 10 Hz to 1 MHz, and the measurement of the electrostatic capacitance (Cx) at a frequency of 100 kHz is used as a representative value.

The dielectric constant $\in_r$ is determined by calculation from the following formula.

$$\in_r = C_x \times h / (\in_0 \times A)$$

$\in_r$: dielectric constant (−) of electret sheet
$C_x$: electrostatic capacitance (pF) of electret sheet
h: thickness (m) of electret sheet
$\in_0$: vacuum permittivity=8.854 (pF/m)
A: area of main electrode =$3.848 \times 10^{-4}$ (m$^2$)

(Arithmetic Average Surface Roughness of Surface)

The surface of the electret sheet is preferably smooth from the perspective of the workability into a filter structure and preferably has irregularities from the perspective of the retention capability of dust adsorbed to the filter.

Therefore, the arithmetic average surface roughness (SRa) of the surface of the electret sheet is preferably from 0.1 to 5 μm and more preferably from 0.3 to 4 μm.

The arithmetic average surface roughness (SRa) of the surface of the electret sheet can be measured using a probe-type three-dimensional surface roughness meter. Specific examples of measurement devices include the "SURFCOM Series (5000DX, 2000DX3/SX3, 1500DX3/SD3, 1900DX3/SX, and 2900DX3/SX)" (trade name) manufactured by TOKYO SEIMITSU Co., Ltd. and the "Surfcorder Series (SE3500K and SE4000)" (trade name) manufactured by Kosaka Laboratory Ltd. It is preferable to use a device having a measurement precision of not more than 0.01 μm in the measurement of the arithmetic average surface roughness (SRa).

(Specific Resistivity of Surface)

The resin film layer (A) may be provided with an antistatic layer on one surface thereof as described above, but in order to form an electret sheet by performing electrification treatment on the resin film layer (A), the surface resistivity of the surface of the resin film layer (A) not having the antistatic layer is preferably in the range of from $1 \times 10^{13}$ to $9 \times 10^{17} \Omega$. The surface resistivity is more preferably in the range of from $5 \times 10^{13}$ to $9 \times 10^{16} \Omega$ and even more preferably in the range of from $1 \times 10^{14}$ to $9 \times 10^{15} \Omega$. When the surface resistivity is less than $1 \times 10^{13} \Omega$, the charge provided when the electrification treatment described below is performed tends to escape through the film surface, so the efficiency of charge injection into the resin film layer (A) decreases. Therefore, the charge density of the electret sheet surface also decreases, and the volume charge density and the electrostatic adsorption performance are also diminished. Alternatively, it becomes necessary to apply an excessive amount of energy for electrification treatment. On the other hand, when the surface resistivity of the surface exceeds $9 \times 10^{17} \Omega$, although there is no problem with regard to the function of the electret sheet, it is difficult to form a surface of such high insulation using currently known resources, and even if it could be realized, it would not be realistic due to the high cost.

The surface resistivity of the surface of the resin film layer (A) within the desired range can be achieved by using a polyolefin-based resin having excellent insulation as a thermoplastic resin or by adjusting the type or amount of the inorganic fine powder added to the layer.

[Electretization]

An electret sheet is obtained by performing electretization treatment on the resin film layer (A) so as to retain a charge on the surface or inside the sheet.

The electretization of the resin film layer (A) may be performed prior to establishing the shape of the filter having an air channel structure or may be performed after establishing the shape of the filter. However, since the electretization device becomes complex in order to perform electretization treatment uniformly over a three-dimensional object, it is preferable to perform electrification treatment on the resin film layer (A) in advance to form an electret sheet and to then use the sheet to form a filter.

The method of electretization is not particularly limited, and electretization may be performed in accordance with various conventionally known methods. Examples include a method of applying a corona discharge or a pulse-like high voltage to the surface of the resin film layer (A) (electro-electretization method); a method of holding both surfaces of the resin film layer (A) with a dielectric and applying a DC high voltage to both surfaces; and a method of electretizing the resin film layer (A) by irradiating the layer with ionizing radiation such as γ-rays or an electron beam (radio-electretization).

(Electro-Electretization Method)

Figure 9:
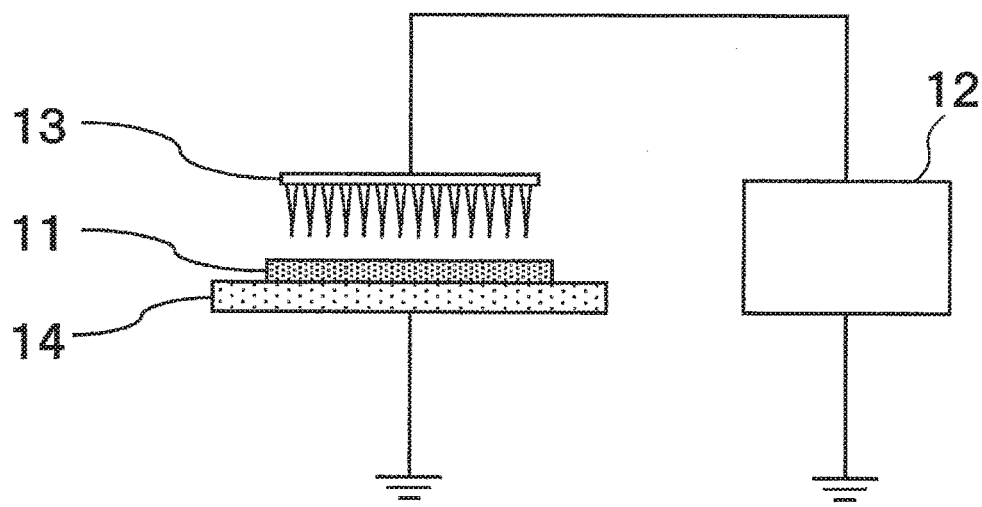
FIG. 9 is an example of a batch-type corona discharge treatment apparatus that can be used in the electrification treatment of the present invention.
Figure 10:
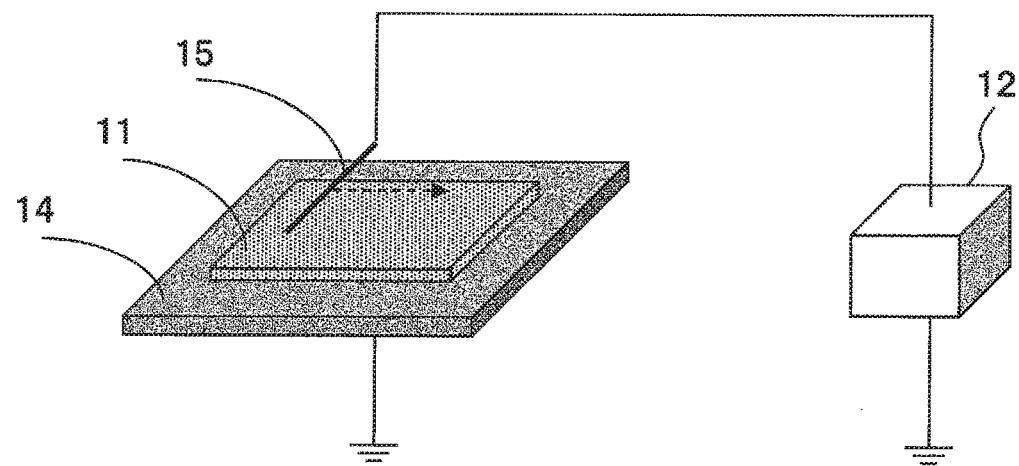
FIG. 10 is an example of a batch-type corona discharge treatment apparatus that can be used in the electrification treatment of the present invention.
Figure 11:
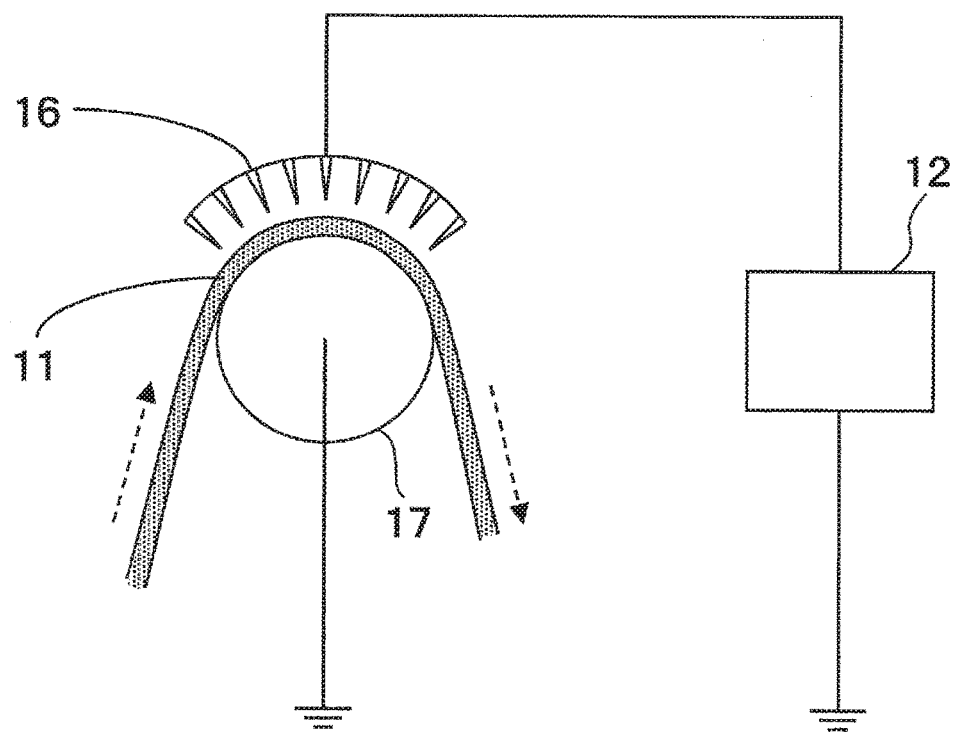
FIG. 11 is an example of a continuous-type corona discharge treatment apparatus that can be used in the electrification treatment of the present invention.
Figure 12:
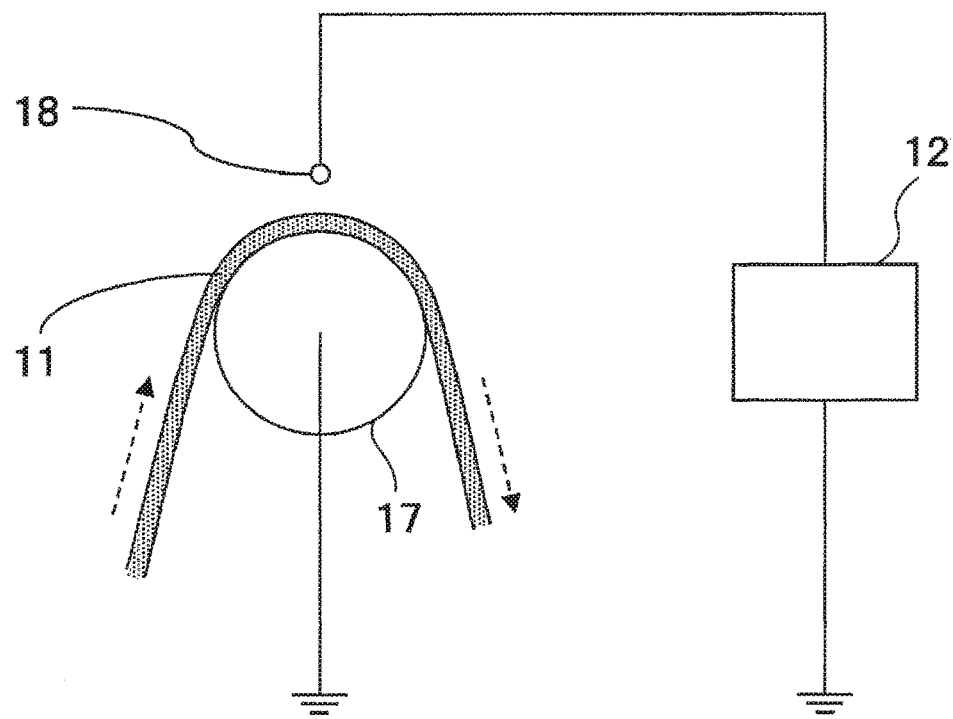
FIG. 12 is an example of a continuous-type corona discharge treatment apparatus that can be used in the electrification treatment of the present invention.
Figure 13:
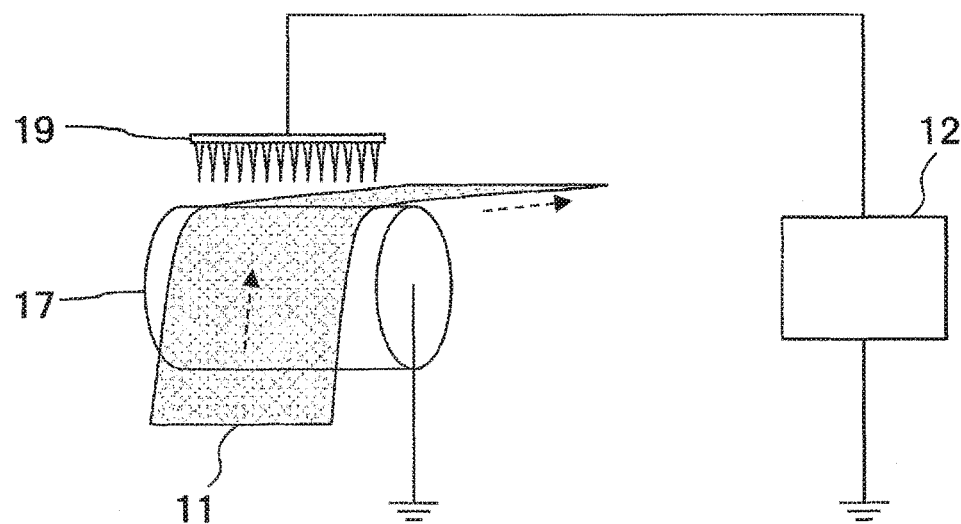
FIG. 13 is an example of a continuous-type corona discharge treatment apparatus that can be used in the electrification treatment of the present invention.

As a specific example of an electro-electretization method, the following methods are preferable: a method of fixing a resin film layer (A) 11 between application electrodes 13 and 15, which are connected to a DC high-voltage power supply 12, and a plate-shaped ground electrode 14 (batch method, see FIGS. 9 and 10); or a method of placing a resin film layer (A) 11 on a roller-shaped ground electrode 17, which rotates with respect to application electrodes 16, 18, and 19 connected to a DC high-voltage power supply thus moving the layer through the electrode (continuous method, see FIGS. 11 to 13) is preferable. For the application electrodes when this technique is used, it is preferable to arrange needle-shaped electrodes countlessly at equal intervals or to use a metal wire, and it is preferable to use a flat metal plate or a metal roller for the ground electrode.

It is more preferable to use DC corona discharge treatment for electretization. DC corona discharge treatment is a treatment in which, as illustrated in FIGS. 9 to 13, a device, in which needle-shaped or wire-shaped main electrodes (application electrodes 13, 15, 16, 18, and 19) and plate or roller-shaped counter electrodes (ground electrodes 14 and 17) are connected to a DC high-voltage power supply 12, is used, and a charge is injected into the resin film layer (A) using the corona discharge generated by applying a DC high voltage between the main electrodes and the counter electrodes.

The spacing between the main electrodes and the counter electrodes is preferably from 1 to 50 mm, more preferably from 2 to 30 mm, and even more preferably from 5 to 20 mm. When the distance between the electrodes is less than 1 mm, it becomes difficult to uniformly maintain the distance between the electrodes in the sheet width direction in the aspect illustrated in FIG. 13, for example, and it may not be possible to perform uniform electrification treatment in the sheet width direction. On the other hand, when the spacing exceeds 50 mm, it becomes difficult to generate a corona discharge, and the electrification treatment applied to the resin film layer (A) may become nonuniform.

The voltage applied between the main electrodes and the counter electrodes is determined by the electrical characteristics (insulation and the like) of the resin film layer (A), the electrical characteristics (required surface potential and dielectric constant) of the electret sheet, the shapes and materials of the main electrodes and the counter electrodes, the spacing between the main electrodes and the counter electrodes, and the like.

The amount of charge introduced into the resin film layer (A) by the DC corona discharge treatment depends on the amount of current flowing into the main electrodes and the counter electrodes at the time of treatment. The amount of current increases as the voltage between the electrodes becomes higher. Therefore, when an effective treatment result is desired for the electret sheet, the applied voltage is preferably set to a high enough level that the resin film layer (A) will not undergo insulation breakdown. On the other hand, considering the typical DC corona discharge treatment, the applied voltage is preferably in the range of from 1 to 100 kV, more preferably in the range of from 3 to 70 kV, even more preferably in the range of from 5 to 50 kV, and particularly preferably in the range of from 10 to 30 kV, specifically. The polarity on the main electrode side may be positive or negative, but setting the main electrode side to a negative polarity is preferable in that relatively stable corona discharge treatment can be performed.

The materials of the main electrodes and the counter electrodes are selected appropriately from electrically conductive substances, but electrodes made of carbon or metals such as iron, stainless steel, copper, brass, or tungsten are typically used.

The resin film layer (A) may be subjected to destaticizing treatment after electretization treatment. The destaticizing treatment described here refers to temporarily reducing/removing the charge on the surface using a conventionally known destaticizing device such as a voltage application-type destaticizing device (ionizer) or a self-discharge-type destaticizing device in order to avoid troubles during the production process including processing from the electret sheet into a filter, such as the adsorption of dust and dirt, the sticking of sheets to one another, or the sticking of sheets to the production equipment. It becomes easy to avoid the troubles described above by performing destaticizing treatment. On the other hand, although these typical destaticizing devices are able to reduce/remove the charge on the sheet surface, they are unable to remove the charge accumulated inside the sheet. Therefore, the electrostatic adsorptive force of the electret sheet is not greatly affected by destaticizing treatment.

[Filter Production Method]

The filter is one having air channels formed using an electret sheet, but the three-dimensional structure thereof is not particularly limited. The filter may employ the various three-dimensional structures described with regard to the channel structures described above. Of these, as illustrated in FIGS. 4 and 6, it preferably has a structure, in which electret sheets 7a and 7b processed into a wave shape or a pleated shape by corrugation and an electret sheet 6 with a flat shape not subjected to corrugation are alternately laminated and then adhered or fused together.

Figure 5:
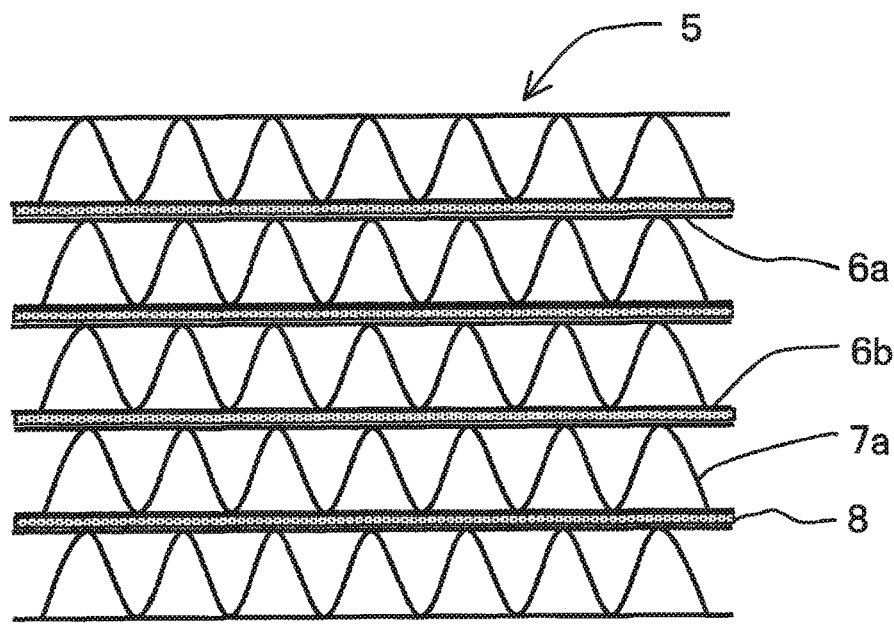
FIG. 5 is another aspect of the cross section of the filter of the present invention.
Figure 7:
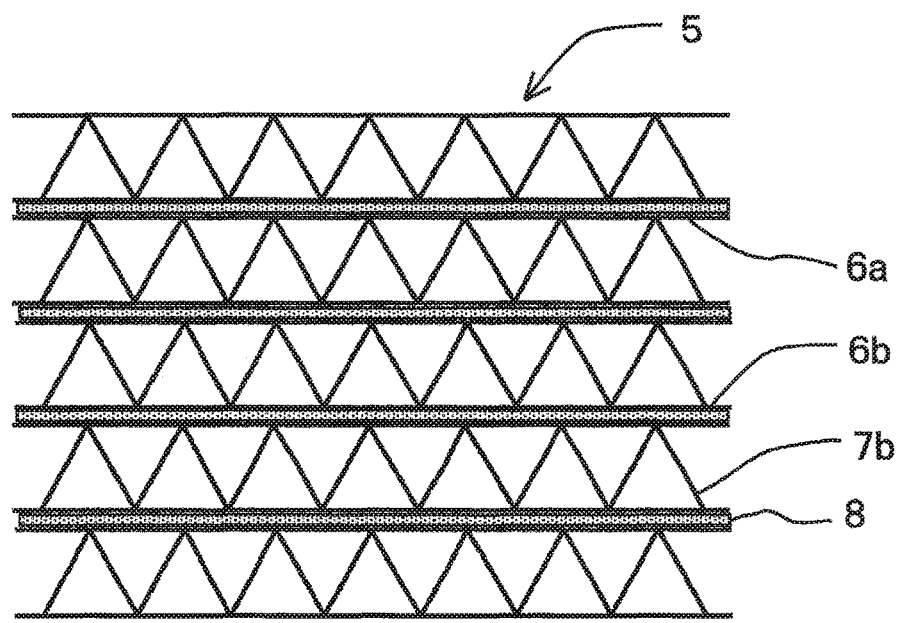
FIG. 7 is another aspect of the cross section of the filter of the present invention.

In addition, as illustrated in FIGS. 5 and 7, the three-dimensional structure of the filter or the air channels may be obtained by laminating electret sheets 7a and 7b processed into a wave shape or a pleated shape by corrugation so as to be sandwiched by electret sheets 6a and 6b with a flat shape not subjected to corrugation, and then adhering the contact points of the electret sheets 6a and 6b of the plurality of laminates using an adhesive 8 such as a pressure-sensitive adhesive or by means of heat sealing using a heat-sealable adhesive.

(Corrugation Processing)

The corrugated structure when a filter is formed by corrugating an electret sheet can be produced by appropriately utilizing a corrugation machine such as a honeycomb machine used in the production of an ordinary paper honeycomb core or a single-facer used in the production of ordinary paper cardboard.

When a honeycomb machine used in the production of a honeycomb core is used, for example, a honeycomb structure is obtained as follows: multiple linear coated lines of an adhesive with a coating width of n and a pitch of 4 n are provided on an electret sheet; then a separate sheet having multiple coated lines of an adhesive provided in the same manner is laminated on the same sheet shifted by ½ pitch (=2 n); a laminate is obtained by repeating the process; and a honeycomb structure is obtained by expanding the resulting laminate in a direction orthogonal to the plane of the sheets.

On the other hand, when a single facer used in the production of paper cardboard is used, as illustrated in FIG. 4, a corrugated core is obtained as follows: an electret sheet is supplied to the space between a pair of gears engaged with one another and bended so as to be corrugated into a wave shape; and then a sheet with a flat shape not subjected to corrugation (also called a "liner 6" hereafter) is attached to one or both surfaces of the sheet that has been subjected to corrugation (also called a "flute 7" hereafter).

At this time, a separate plastic sheet or the like obtained by melt-extrusion forming from a T-die may be used as the liner 6, but it is preferable to use the same sheet as the resin film layer (A) described above from the perspective of enhancing the volume charge density of the filter, and it is even more preferable to use an electret sheet obtained by electretizing this sheet.

When a structure is produced by alternately laminating an electret sheet (flute 7) processed into a wave shape by corrugation and an electret sheet (liner 6) with a flat shape not subjected to corrugation, a liner provided with the antistatic layer described above on one surface may be used from the perspective of the ease of handling the structure after corrugation.

In this case, a surface on which an antistatic layer is provided in advance is used as a surface not in contact with the flute 7. Preferably, a corrugated structure having a liner 6 on both surfaces of the flute 7 is used, wherein a plurality of structures having antistatic layers on the outer surfaces of both liners (surfaces of the liners not in contact with the flute) are obtained, and one of the liners of the corrugated structure (the surface of the liner having an antistatic layer) and the other liner of the another corrugated structure (the surface of the liner having an antistatic layer) are adhered to one another via an adhesive.

As a result, it is possible to obtain a filter 5, in which the antistatic layer is ultimately not exposed to the air channels.

(Adhesive)

A conventionally known adhesive for dry lamination or a pressure-sensitive adhesive is preferably used as the adhesive used for adhering the electret sheets.

An example of an adhesive is a liquid adhesive in a solution state or an emulsion state in which a resin component such as an ether resin, an ester resin, a urethane resin, a urea resin, an acrylic resin, an amide resin, an epoxy resin, or the like is dissolved, dispersed, emulsified/dispersed, and diluted using a conventionally known solvent so that the adhesive has fluidity and can be applied by means of coating.

Examples of ether resins include polyether polyols obtained by using a low-molecular-weight polyol such as propylene glycol, ethylene glycol, glycerin, trimethylol propane, or bisphenol A as an initiator and polymerizing an oxirane compound such as ethylene oxide, propylene oxide, butylene oxide, or tetrahydrofuran, and specific examples include polypropylene glycol, polyethylene glycol, and polytetramethylene glycol.

An example of an ester resin is a dehydration condensation reaction product of a polybasic acid and a polyhydric alcohol. Examples of polybasic acids include isophthalic acid, terephthalic acid, phthalic anhydride, dimethyl isophthalate esters, dimethyl terephthalate esters, adipic acid, azelaic acid, sebacic acid, glutaric acid, and hexahydrophthalic anhydride, and these may be used alone, or two or more types may be used in combination. Examples of polyhydric alcohols include ethylene glycol, diethylene glycol, triethylene glycol, trimethylol propane, propylene glycol, dipropylene glycol, 1,6-hexanediol, neopentyl glycol, hydrogenated bisphenol A, 1,4-butanediol, 1,4-cyclohexanedimethanol, 2,2,4-trimethylpentane-1,3-diol, and polyethylene glycol, and these may be used alone, or two or more types may be used in combination.

An example of a urethane resin is a condensation reaction product of at least one type of the polyhydric alcohols, ether resins, and ester resins described above and an isocyanate compound. Examples of isocyanate compounds include aliphatic isocyanates such as hexamethylene diisocyanate, 2,4-diisocyanate-1-methylcyclohexane, diisocyanate cyclobutane, tetramethylene diisocyanate, hydrogenated xylylene diisocyanate, dicyclohexylmethane diisocyanate, dimethyldicyclohexylmethane diisocyanate, lysine diisocyanate, cyclohexane diisocyanate, dodecane diisocyanate, tetramethylxylene diisocyanate, isophorone diisocyanate, and the like; aromatic isocyanates such as tolylene-2,4-diisocyanate, tolylene-2,6-diisocyanate, diphenylmethane-4,4'-diisocyanate, 3-methyldiphenylmethane-4,4'-diisocyanate, m- or p-phenylene diisocyanate, o-, m-, or p-xylylene diisocyanate, chlorophenylene-2,4-diisocyanate, naphthalene-1,5-diisocyanate, diphenyl-4,4'-diisocyanate, 3,3'-dimethyldiphenyl-1,3,5-triisopropylbenzene-2,4-diisocyanate carbodiimide-modified diphenylmethane diisocyanate, polyphenyl polymethylene polyisocyanate, and the like; and isocyanate monomers such as diphenyl ether diisocyanate, and the like. Further, in order to increase the molecular weight of the urethane resin and to impart various types of performance such as adhesive force or stability, a polyisocyanate compound modified by a polyhydric alcohol may also be used as the isocyanate compound.

An example of a urea resin is a condensation reaction product of an amine compound and the isocyanate compound described above. Examples of amine compounds include aliphatic amines such as ethylene diamine, 1,2-propylene diamine, 1,3-propylene diamine, 1,4-butane diamine, hexamethylene diamine, diethylene triamine, triethylene tetramine, tetraethylene pentamine, and the like; alicyclic amines such as isophorone diamine, dicyclohexylmethane diamine, methylcyclohexane diamine, isopropylidene-bis-4-cyclohexyl diamine, 1,4-cyclohexane diamine, and the like; and heterocyclic amines such as piperazine, methyl piperazine, aminoethyl piperazine, and the like.

An example of an acrylic resin is one prepared by polymerizing an acrylic compound using an organic peroxide as a polymerization initiator. Examples of acrylic compounds include (meth)acrylic acid, methyl (meth)acrylate, ethyl (meth)acrylate, n-propyl (meth)acrylate, n-butyl (meth)acrylate, t-butyl (meth)acrylate, cyclohexyl (meth) acrylate, 2-ethylhexyl (meth)acrylate, lauryl (meth)acrylate, tridecyl (meth)acrylate, stearyl (meth)acrylate, 2-hydroxyethyl (meth)acrylate, 2-hydroxypropyl (meth)acrylate, (meth)acrylonitrile, (meth)acrylamide, and glycidyl (meth) acrylate, and these may be used alone, or two or more types may be used in combination.

An example of an amide resin is a condensation reaction product of the polybasic acid and the amine compound described above.

An example of an epoxy resin is a condensation reaction product obtained by a single condensation reaction of a polyglycidyl ether obtained by reacting a polyhydric phenol and at least one of epihalohydrin and a low-molecular-weight epoxy compound, or a condensation reaction with the aforementioned ether resins, ester resins, urethane resins, urea resins, acrylic resins, and amide resins. Specific examples of polyhydric phenols include bisphenols such as bisphenol A(2,2-bis(4-hydroxyphenyl)propane), bisphenol B(2,2-bis(hydroxyphenyl)butane), bisphenol E(2,2-bis(4-hydroxyphenyl)ethane), bisphenol S(2,2-bis(4-hydroxyphenyl)sulfone), 2,2-bis(4-hydroxyphenyl)-4-methylpentane, 1,1-bis(4-hydroxyphenyl)-2-methylpropane, bis(4-hydroxyphenyl)phenylmethane, 2,2-bis(4-hydroxy-3,5-dimethylphenyl)methane, 2,2-bis(4-hydroxy-3,5-dimethylphenyl) ethane, 2,2-bis(4-hydroxy-3,5-dimethylphenyl)propane, 2,2-bis(4-hydroxy-3,5-dimethylphenyl)butane, 2,2-bis(4-hydroxy-3-methylphenyl)butane, 2,2-bis(4-hydroxy-3-methylphenyl)-2-phenylethane, biphenol, bis(4-hydroxyphenyl)ether, and bis(4-hydroxyphenyl)ketone.

(Heat Sealable Adhesive)

Examples of substances suitable as a heat sealable adhesive to be used for the adhesion of the electret sheet include low-density polyethylenes, ethylene-vinylacetate copolymers, metal salts of ethylene-(meth)acrylic acid copolymers, polyolefin-based resins such as chlorinated polyethylenes and chlorinated polypropylenes, polyamide-based resins, polybutyral-based resins, and urethane-based resins.

(Thickness)

When an adhesive is provided by coating, the thickness of the adhesive after drying is preferably from 0.1 to 500 µm, more preferably from 0.2 to 50 µm, and even more preferably from 0.5 to 25 µm. When the thickness of the adhesive is less than 0.1 µm, areas partially uncoated with the adhesive tend to be formed, and it tends to become difficult to maintain the structure of the filter. On the other hand, when the thickness exceeds 500 µm, excess adhesive may leak and partially cover the surface of the electret sheet, which may inhibit the electrostatic adsorptive force of the filter.

EXAMPLES

The present invention will be described more specifically hereinafter while citing working examples, comparative examples, and test examples. However, the materials, amounts used, ratios, operations, and the like described below may be modified appropriately as long as they do not depart from the spirit of the present invention. Therefore, the scope of the present invention is not limited by the specific examples given below. Here, the symbol "%" associated with the raw material compositions described below refers to "mass %" unless stated otherwise.

<Thermoplastic Resin Composition Production Examples>
<Thermoplastic Resin Composition (a)>

A propylene homopolymer (trade name: Novatec PP FY4 manufactured by Japan Polypropylene Corporation) was melt-kneaded with a twin-screw kneader set to 210° C., and this was then extruded into a strand shape with an extruder set to 230° C. After cooling, the sample was cut with a strand cutter to form a pellet of a thermoplastic resin composition (a), and this was used in the subsequent production examples.

<Thermoplastic Resin Composition (b)>

First, 90% of a propylene homopolymer (trade name: Novatec PP FY4 manufactured by Japan Polypropylene Corporation), 5% of a high-density polyethylene (trade name: Novatec HD HJ360 manufactured by Japan Polyethylene Corporation), and 5% of heavy calcium carbonate (trade name: Softon 1800 manufactured by Bihoku Funka Kogyo Co., Ltd.) were melt-kneaded with a twin-screw kneader set to 210° C., and this was then extruded into a strand shape with an extruder set to 230° C. After cooling, the sample was cut with a strand cutter to form a pellet of a thermoplastic resin composition (b), and this was used in the subsequent production examples.

<Thermoplastic Resin Compositions (c) to (h)>

Pellets of thermoplastic resin compositions (c) to (h) were produced with the same method as that used in the production of thermoplastic resin composition (b) with the exception that the propylene homopolymer, high-density polyethylene, and heavy calcium carbonate that were used and the compounding ratios thereof were changed as shown in Table 1, and these were used in the subsequent production examples.

The raw materials used and the compounding ratios thereof in each composition are shown collectively in Table 1.

TABLE 1

| Raw materials used | Thermoplastic resin composition Compounding ratio (mass %) | | | |
|---|---|---|---|---|
| | Composition a | Composition b | Composition c | Composition d |
| Propylene homopolymer (trade name: Novatec PP FY4, manufactured by Japan Polypropylene Corporation, MFR (230° C., 2.16 kg load): 5 g/10 min, melting point: 165° C.) | 100 | 90 | 80 | 70 |
| Propylene homopolymer (trade name: Novatec PP MA3, manufactured by Japan Polychem Corporation, MFR (230° C., 2.16 kg load): 11 g/10 min, melting point: 165° C.) | — | — | — | — |
| High-density polyethylene (trade name: Novatec HD HJ360, manufactured by Japan Polyethylene Corporation, MFR (190° C., 2.16 kg load): 5 g/10 min, melting point: 131° C.) | — | 5 | 10 | 10 |
| Heavy calcium carbonate (trade name: Softon 1800 manufactured by Bihoku Funka Kogyo Co., Ltd., average particle size: 1.2 μm) | — | 5 | 10 | 20 |
| Heavy calcium carbonate (trade name: BF100 manufactured by Bihoku Funka Kogyo Co., Ltd., average particle size: 3.6 μm) | — | — | — | — |

| Raw materials used | Thermoplastic resin composition Compounding ratio (mass %) | | | |
|---|---|---|---|---|
| | Composition e | Composition f | Composition g | Composition h |
| Propylene homopolymer (trade name: Novatec PP FY4, manufactured by Japan Polypropylene Corporation, MFR (230° C., 2.16 kg load): 5 g/10 min, melting point: 165° C.) | — | — | 70 | — |
| Propylene homopolymer (trade name: Novatec PP MA3, manufactured by Japan Polychem Corporation, MFR (230° C., 2.16 kg load): 11 g/10 min, melting point: 165° C.) | 60 | 60 | — | 70 |
| High-density polyethylene (trade name: Novatec HD HJ360, manufactured by Japan Polyethylene Corporation, MFR (190° C., 2.16 kg load): 5 g/10 min, melting point: 131° C.) | 10 | — | 10 | — |
| Heavy calcium carbonate (trade name: Softon 1800 manufactured by Bihoku Funka Kogyo Co., Ltd., average particle size: 1.2 μm) | 30 | 40 | — | — |

TABLE 1-continued

| | | | | |
|---|---|---|---|---|
| Heavy calcium carbonate (trade name: BF100 manufactured by Bihoku Funka Kogyo Co., Ltd., average particle size: 3.6 μm) | — | — | 20 | 30 |

Resin Film Layer (A) Production Examples

Resin Film Layer (A) Production Example 1

After thermoplastic resin composition (c) was melt-kneaded with an extruder set to 230° C., the composition was supplied to an extrusion die set to 250° C. and extruded into a sheet shape, and this was cooled to 60° C. with a cooling apparatus to obtain an unstretched sheet.

This unstretched sheet was heated to 135° C. and stretched 5-fold in the machine-direction (MD) utilizing the circumferential speed difference of a group of rollers to obtain a 5-fold stretched sheet. Next, this 5-fold stretched sheet was cooled to 60° C., once again heated to approximately 155° using a tenter oven, stretched 8-fold in the transverse direction (TD), and then heat-treated by further heating to 160° C.

Next, the sheet was cooled to 60° C., and after the edge of the sheet was slit, both surfaces of the biaxially stretched film were subjected to surface treatment by means of corona discharge to obtain a resin film layer (A) of Production Example 1 having a thickness of 30 μm and a porosity of 20.3%. This was used in the subsequent production of an electret sheet.

Resin Film Layer (A) Production Example 2

After thermoplastic resin composition (g) was melt-kneaded with one extruder set to 230° C. and thermoplastic resin composition (b) was respectively melt-kneaded with two extruders set to 230° C., the respective thermoplastic resin compositions were supplied to an extrusion die set to 250° C. The respective thermoplastic resin compositions were laminated in three layers of b/g/b in the die and extruded into a sheet shape, and this was cooled to 60° C. with a cooling apparatus to obtain an unstretched sheet having a three-layer structure.

This unstretched sheet was heated to 135° C. and stretched 5-fold in the machine-direction utilizing the circumferential speed difference of a group of rollers. Next, this 5-fold stretched sheet was cooled to 60° C., once again heated to approximately 150° using a tenter oven, stretched 9-fold in the transverse direction, and then heat-treated by further heating to 160° C.

Next, the sheet was cooled to 60° C., and after the edge of the sheet was slit, both surfaces of the biaxially stretched film were subjected to surface treatment by means of corona discharge to obtain a resin film layer (A) of Production Example 2 having a thickness of 70 μm, a porosity of 55.4%, and a three-layer structure [each layer resin composition (b/g/b), each layer thickness (2 μm/66 μm/2 μm), number of axes of stretching of each layer (biaxial/biaxial/biaxial)]. This was used in the subsequent production of an electret sheet.

Resin Film Layer (A) Production Example 3

After thermoplastic resin composition (d) was melt-kneaded with an extruder set to 230° C., the composition was supplied to an extrusion die set to 250° C. and extruded into a sheet shape, and this was cooled to 60° C. with a cooling apparatus to obtain an unstretched sheet.

This unstretched sheet was heated to 145° C. and stretched 5-fold in the machine-direction utilizing the circumferential speed difference of a group of rollers to obtain a 5-fold stretched sheet. Next, after thermoplastic resin composition (e) was melt-kneaded with two extruders set to 250° C., the composition was extruded into a sheet shape and respectively laminated on both surfaces of the 5-fold stretched sheet to obtain a laminated sheet with a three-layer structure. Next, this laminated sheet was cooled to 60° C., once again heated to approximately 150° using a tenter oven, stretched 8.5-fold in the transverse direction, and then heat-treated by further heating to 160° C.

Next, the sheet was cooled to 60° C., and after the edge of the sheet was slit, both surfaces of the laminated sheet were subjected to surface treatment by means of corona discharge to obtain a resin film layer (A) of Production Example 3 having a thickness of 50 μm, a porosity of 30.2%, and a three-layer structure [each layer resin composition (e/d/e), each layer thickness (10 μm/30 μm/10 μm), number of axes of stretching of each layer (uniaxial/biaxial/uniaxial)]. This was used in the subsequent production of an electret sheet.

Resin Film Layer (A) Production Example 4

After thermoplastic resin composition (d) was melt-kneaded with an extruder set to 230° C., the composition was supplied to an extrusion die set to 250° C. and extruded into a sheet shape, and this was cooled to 60° C. with a cooling apparatus to obtain an unstretched sheet.

This unstretched sheet was heated to 145° C. and stretched 5-fold in the machine-direction utilizing the circumferential speed difference of a group of rollers to obtain a 5-fold stretched sheet. Next, after thermoplastic resin composition (f) was melt-kneaded with an extruder set to 250° C., the composition was extruded into a sheet shape and laminated on one surface of the 5-fold stretched sheet while cooling with a gravure roller (150 lines/pyramid-type). After thermoplastic resin composition (f) was further melt-kneaded with another extruder set to 250° C., the composition was extruded into a sheet shape and laminated on the other surface of the 5-fold stretched sheet while cooling with a gravure roller (150 lines/pyramid-type) to obtain a laminated sheet with a three-layer structure. Next, this laminated sheet was cooled to 60° C., once again heated to approximately 150° using a tenter oven, stretched 8.5-fold in the transverse direction, and then heat-treated by further heating to 160° C.

Next, the sheet was cooled to 60° C., and after the edge of the sheet was slit, both surfaces of the laminated sheet were subjected to surface treatment by means of corona discharge to obtain a resin film layer (A) of Production Example 4 having a thickness of 110 μm, a porosity of 30%, and a three-layer structure [each layer resin composition (f/d/f), each layer thickness (20 μm/70 μm/20 μm), number of axes of stretching of each layer(uniaxial/biaxial/uniaxial)]. This was used in the subsequent production of an electret sheet.

Resin Film Layer (A) Production Example 5

After thermoplastic resin composition (d) was melt-kneaded with an extruder set to 230° C., the composition was supplied to an extrusion die set to 250° C. and extruded into a sheet shape, and this was cooled to 60° C. with a cooling apparatus to obtain an unstretched sheet.

This unstretched sheet was heated to 145° C. and stretched 5-fold in the machine-direction utilizing the circumferential speed difference of a group of rollers to obtain a 5-fold stretched sheet. Next, after thermoplastic resin composition (f) was melt-kneaded with two extruders set to 250° C., the composition was extruded into a sheet shape and respectively laminated on both surfaces of the 5-fold stretched sheet to obtain a laminated sheet with a three-layer structure. Next, this laminated sheet was cooled to 60° C., once again heated to approximately 150° using a tenter oven, stretched 8.5-fold in the transverse direction, and then heat-treated by further heating to 160° C.

Next, the sheet was cooled to 60° C., and after the edge of the sheet was slit, both surfaces of the laminated sheet were subjected to surface treatment by means of corona discharge to obtain a resin film layer (A) of Production Example 5 having a thickness of 200 μm, a porosity of 32.2%, and a three-layer structure [each layer resin composition (f/d/f), each layer thickness (50 μm/100 μm/50 μm), number of axes of stretching of each layer (uniaxial/biaxial/uniaxial)]. This was used in the subsequent production of an electret sheet.

Resin Film Layer (A) Production Example 6

After thermoplastic resin composition (b) was melt-kneaded with an extruder set to 230° C., the composition was supplied to an extrusion die set to 250° C. and extruded into a sheet shape, and this was cooled to 60° C. with a cooling apparatus to obtain an unstretched sheet.

This unstretched sheet was heated to 150° C. and stretched 4-fold in the machine-direction utilizing the circumferential speed difference of a group of roller to obtain a 4-fold stretched sheet. Next, after thermoplastic resin composition (e) was melt-kneaded with two extruders set to 250° C., the composition was extruded into a sheet shape and respectively laminated on both surfaces of the 4-fold stretched sheet to obtain a laminated sheet with a three-layer structure. Next, this laminated sheet was cooled to 60° C., once again heated to approximately 155° using a tenter oven, stretched 8-fold in the transverse direction, and then heat-treated by further heating to 160° C.

Next, the sheet was cooled to 60° C., and after the edge of the sheet was slit, both surfaces of the laminated sheet were subjected to surface treatment by means of corona discharge to obtain a resin film layer (A) of Production Example 6 having a thickness of 60 μm, a porosity of 5.1%, and a three-layer structure [each layer resin composition (e/b/e), each layer thickness (10 μm/40 μm/10 μm), number of axes of stretching of each layer (uniaxial/biaxial/uniaxial)]. This was used in the subsequent production of an electret sheet.

Resin Film Layer (A) Production Example 7

After thermoplastic resin composition (a) was melt-kneaded with an extruder set to 230° C., the composition was supplied to an extrusion die set to 250° C. and extruded into a sheet shape, and this was cooled to 60° C. with a cooling apparatus to obtain an unstretched sheet.

This unstretched sheet was heated to 150° C. and stretched 5-fold in the machine-direction utilizing the circumferential speed difference of a group of roller to obtain a 5-fold stretched sheet. Next, this 5-fold stretched sheet was cooled to 60° C., once again heated to approximately 150° using a tenter oven, stretched 9-fold in the transverse direction, and then heat-treated by further heating to 160° C.

Next, the sheet was cooled to 60° C., and after the edge of the sheet was slit, both surfaces of the biaxially stretched film were subjected to surface treatment by means of corona discharge to obtain a resin film layer (A) of Production Example 7 having a thickness of 40 μm and a porosity of 0%. This was used in the subsequent production of an electret sheet.

Resin Film Layer (A) Production Example 8

After thermoplastic resin composition (h) was melt-kneaded with one extruder set to 230° C. and thermoplastic resin composition (b) was respectively melt-kneaded with two extruders set to 230° C., the respective thermoplastic resin compositions were supplied to an extrusion die set to 250° C. The respective thermoplastic resin compositions were laminated in three layers of b/h/b in the die and extruded into a sheet shape, and this was cooled to 60° C. with a cooling apparatus to obtain an unstretched sheet having a three-layer structure.

This unstretched sheet was heated to 150° C. and stretched 5-fold in the machine-direction utilizing the circumferential speed difference of a group of roller to obtain a 5-fold stretched sheet. Next, this 5-fold stretched sheet was cooled to 60° C., once again heated to approximately 155° using a tenter oven, stretched 9-fold in the transverse direction, and then heat-treated by further heating to 160° C.

Next, the sheet was cooled to 60° C., and after the edge of the sheet was slit, both surfaces of the biaxially stretched film were subjected to surface treatment by means of corona discharge to obtain a resin film layer (A) of Production Example 8 having a thickness of 150 μm, a porosity of 85%, and a three-layer structure [each layer resin composition (b/h/b), each layer thickness (2 μm/146 μm/2 μm), number of axes of stretching of each layer (biaxial/biaxial/biaxial)]. This was used in the subsequent production of an electret sheet.

The physical properties including the arithmetic average surface roughness (SRa) of the resin film layers (A) obtained in each of the production examples are collectively shown in Table 2.

TABLE 2

| Resin film layer (A) production examples | Layer structure | | Porosity (%) | Arithmetic average surface roughness of surface (SRa) (μm) | |
|---|---|---|---|---|---|
| | Thermoplastic resin composition | Total thickness (thickness of each layer) (μm) | | Front | Back |
| Production Example 1 | c | 30 | 20.3 | 0.29 | 0.28 |
| Production Example 2 | b/g/b | 70 (2/66/2) | 55.4 | 0.44 | 0.45 |

TABLE 2-continued

| Resin film layer (A) production examples | Layer structure | | Porosity (%) | Arithmetic average surface roughness of surface (SRa) (μm) | |
|---|---|---|---|---|---|
| | Thermoplastic resin composition | Total thickness (thickness of each layer) (μm) | | Front | Back |
| Production Example 3 | e/d/e | 50 (10/30/10) | 30.2 | 0.44 | 0.48 |
| Production Example 4 | f/d/f | 110 (20/70/20) | 30.0 | 2.40 | 2.53 |
| Production Example 5 | f/d/f | 200 (50/100/50) | 32.2 | 0.71 | 0.73 |
| Production Example 6 | e/b/e | 60 (10/40/10) | 5.1 | 0.89 | 0.91 |
| Production Example 7 | a | 40 | 0.0 | 0.04 | 0.05 |
| Production Example 8 | b/h/b | 150 (2/146/2) | 85.0 | 0.40 | 0.42 |

[Electret Sheet Production]
(Electret Sheet Production Examples I to VII)

Figure 14:
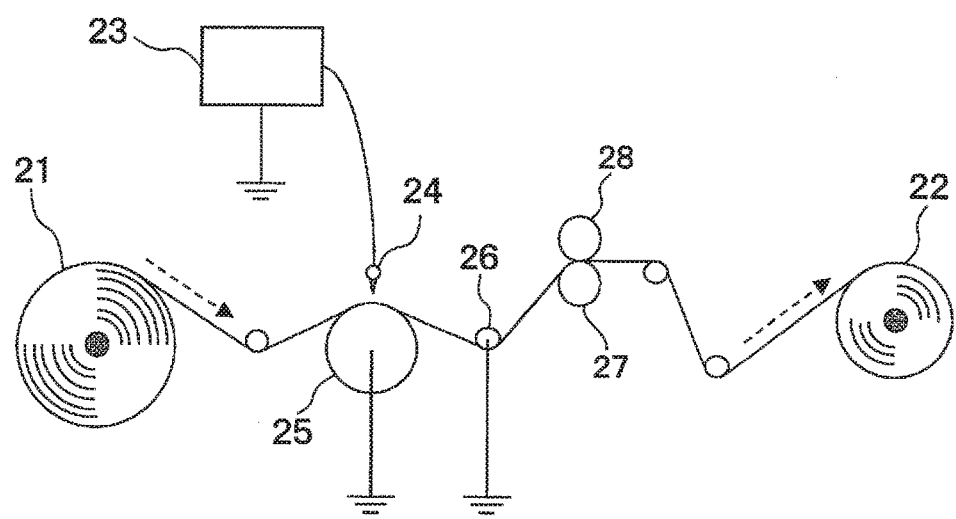
FIG. 14 is a schematic diagram of a production apparatus of the electret sheets used in the working examples of the present invention.

The resin film layer (A) shown in Table 3 was rolled out from a roll 21 using an electret sheet production apparatus illustrated in the schematic diagram of FIG. 14, and charge injection treatment was performed by means of corona discharge from a DC high-voltage power supply 23 between a needle-shaped application electrode 24 and a roller-shaped ground electrode 25. After this was transported by a guide roller 26 and nip rollers 27 and 28, it was wound so as to obtain the electret sheets 22 of Production Examples I to VIII. As conditions for charge injection treatment, the distance between the needle-shaped application electrode 24 and the roller-shaped ground electrode 25 in FIG. 14 was set to 1 cm, and the discharge voltage shown in Table 3 was used in each production example.

The dielectric constants of the electret sheets obtained in each of the production examples are collectively shown in Table 3.

TABLE 3

| Electret sheet production examples | Resin film layer (A) | Discharge voltage (kV) | dielectric constant (—) | Amount of charge (nC/cm$^2$) |
|---|---|---|---|---|
| Production Example I | Production Example 1 | 12 | 1.70 | 2.1 |
| Production Example II | Production Example 2 | 13 | 1.29 | 14.1 |
| Production Example III | Production Example 3 | 15 | 1.55 | 10.5 |
| Production Example IV | Production Example 4 | 22 | 1.56 | 18.2 |
| Production Example V | Production Example 5 | 25 | 1.51 | 8.8 |
| Production Example VI | Production Example 6 | 21 | 1.87 | 12.2 |
| Production Example VII | Production Example 7 | 14 | 2.10 | 1.5 |
| Production Example VIII | Production Example 8 | 12 | 1.08 | 0.3 |

Test Examples (Thickness)

The thickness was measured using a constant pressured thickness measuring instrument (trade name PG-01J, manufactured by TECLOCK Corporation.) in accordance with JIS K-7130.

When the formed resin film layer (A) had a multilayer structure, the thickness of each of the layers was determined as follows: samples for cross-section observation were created by cooling measurement samples to a temperature not greater than −60° C. using liquid nitrogen and then placing them on a glass plate, and cutting at a perpendicular using a razor blade (trade name Proline Blade, manufactured by Schick Japan K.K.). The obtained samples were observed at the cross-section using a scanning electron microscope (trade name JSM-6490, manufactured by JEOL, Ltd.) and the boundary lines of each thermoplastic resin composition were distinguished by compositional appearance, and the thickness of the entire layer and the observed layer thickness ratio of the resin film layer (A) were calculated.

Here, the thickness of the electret sheet and the resin film layer (A) are the same.

(Dielectric constant)

An electrically conductive coating (trade name: DOTITE D-500, manufactured by FUJIKURA KASEI CO., LTD.) was screen-printed onto one surface of the electret sheet obtained in each production example so as to form a circle 70 mm in diameter, and this was cured for not less than 24 hours at room temperature to form a main electrode. Next, a circle 100 mm in diameter was screen-printed onto the surface on the opposite side using the same electrically conductive coating so as to form a concentric circle with the circle on the back surface, and after this was cured for not less than 24 hours at room temperature to form a counter electrode, the electrostatic capacitance was measured.

A "4192A LF IMPEDANCE ANALYZER" (model name) manufactured by Agilent Technologies was used as an electrostatic capacitance measurement device. A voltage of 5 V was applied to each electret sheet under environmental conditions with a temperature 23° C. and a relative humidity of 50%. The electrostatic capacitance was measured at frequencies in the range of from 10 Hz to 1 MHz, and the electrostatic capacitance (Cx) at a frequency of 100 kHz was used as a representative value. Next, the dielectric constant ($\in_r$) was determined by calculation from the following formula using this value and the separately measured thickness.

$$\in_r = C_x \times h / (\in_0 \times A)$$

$\in_r$: dielectric constant (−) of electret sheet
$C_x$: electrostatic capacitance (pF) of electret sheet
h: thickness (m) of electret sheet
$\in_0$: permittivity in a vacuum=8.854 (pF/m)
A: area of main electrode=3.848×10$^{-4}$ (m$^2$)

(Amount of Charge)

Figure 15:
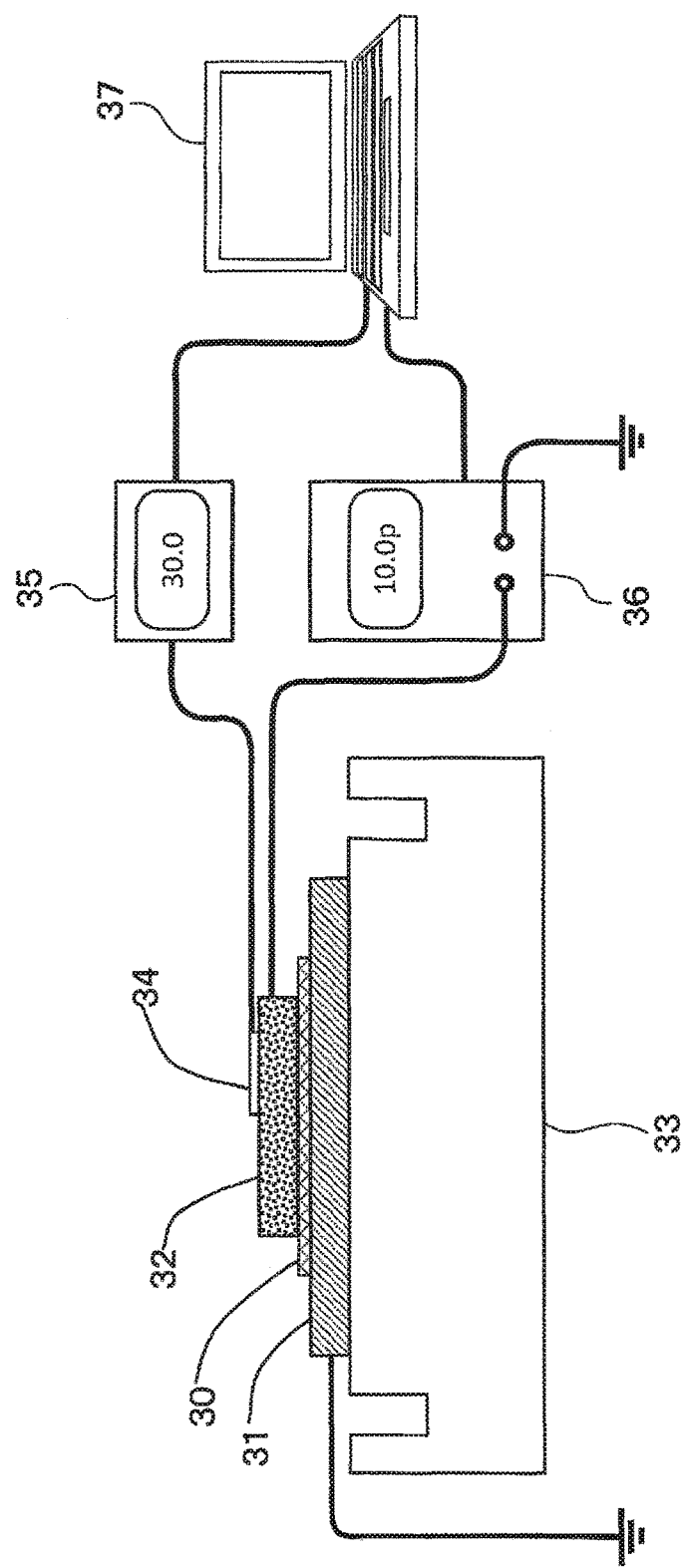
FIG. 15 is a schematic diagram of a charge quantity measuring apparatus of the electret sheets used in the working examples of the present invention.

The electret sheet obtained in each production example was cut into a 15 mm×15 mm square, and this was wrapped in aluminum foil. After the sample was adjusted for 24 hours in an environment at 23° C. and a relative humidity of 50%, the sample was removed from the aluminum foil and mounted on a ground electrode plate 31 placed on a programmable hot plate 33 of the charge amount measurement device illustrated in FIG. 15. A thermocouple 34 and a main electrode plate 32 made of SUS having a 10 mm×10 mm square shape and a thickness of 5 mm were then mounted on the electret sheet 30.

Next, the electret sheet 30 was heated from 30° C. to 200° C. at a heating rate of 5° C./min, and the current flowing between the main electrode plate 32 and the ground electrode plate 31 was measured with an ammeter 36. This measurement was recorded each second with a computer 37, and the sum of the absolute values of the measured current values was determined so as to determine the amount of charge ($Q_s$(nC/cm$^2$)) of each electret sheet.

(Arithmetic Average Surface Roughness (SRa))

The arithmetic average surface roughness (SRa) of the electret sheet obtained in each production example was determined by means of measurement using a three-dimensional surface roughness meter "Surfcom 1500DX3" manufactured by Tokyo Seimitsu Co., Ltd under conditions with a measurement rate of 0.2 mm/see, a measurement length of 5 mm, and a feeding pitch of 20 µm.

FILTER WORKING EXAMPLES AND COMPARATIVE EXAMPLES

Working Example 1

The electret sheet obtained in Production Example 1 was supplied to a single facer used in the production of paper cardboard and was processed so as to form a flute with a peak height of 3 mm and a pitch of 3 mm. A water-based acrylic adhesive (mixture of 100 parts by mass of trade name Saivinol PZ-820 manufactured by Saiden Chemical Industry Co., Ltd. and 2 parts by mass of trade name Saivinol E102 manufactured by Saiden Chemical Industry Co., Ltd.) was applied to the top portion of the flute so that the amount of coating after drying was 50 g/m$^2$, and after the electret sheet obtained in Production Example I was supplied separately as a liner, the flute and the liner were adhered to one another with an adhesive to form one-sided cardboard.

Figure 16:
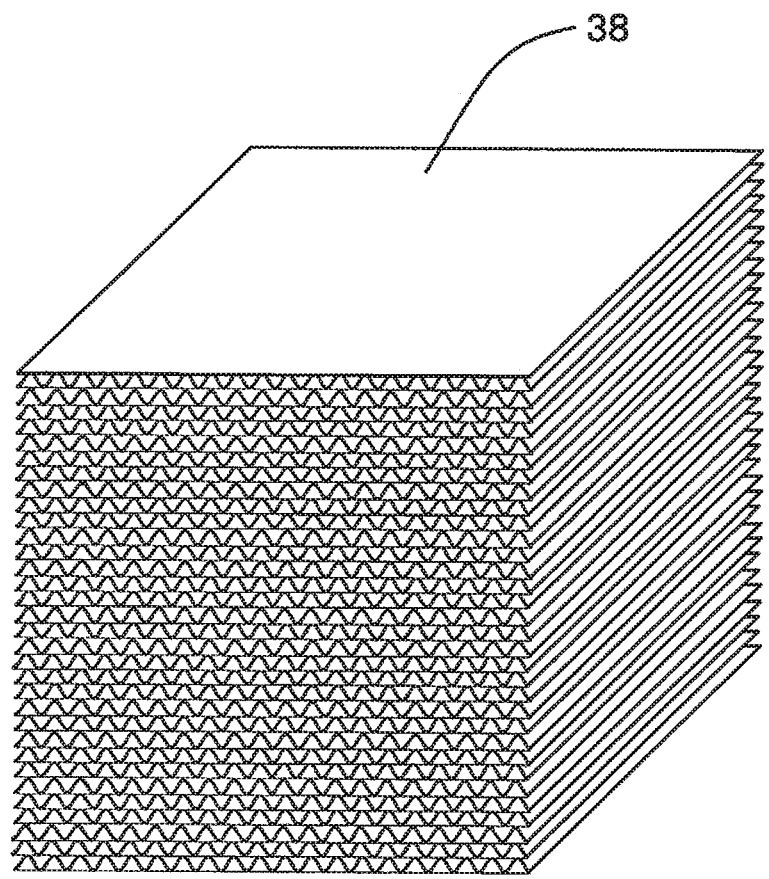
FIG. 16 is a schematic diagram of a filter for evaluation used in the working examples of the present invention.

An adhesive was applied to the other top part of the flute of the prepared one-sided cardboard, and the electret filter 38 illustrated in FIG. 16 was obtained by laminating a separately prepared one-sided cardboard so that the pieces of one-sided cardboard faced the same direction (so that the flute and the liner were laminated alternately).

Working Examples 2 to 6 and Comparative Examples 1 and 2

Electret filters were produced with the same method as in Working Example 1 with the exception that the electret sheets of the production examples shown in Table 4 were used for the flute and liner in the electret filter of Working Example 1.

Working Example 7

A filter was produced with the same method as in Working Example 1 with the exception that the electret sheet of Production Example II was used for the flute and liner in the electret filter of Working Example 1, and the peak height of the single facer was set to 1 mm.

The physical properties and the test results of the filters obtained in each of the working examples and each of the comparative examples are collectively shown in Table 4.

TABLE 4

|  |  | \multicolumn{2}{c}{Electret sheet} | Channel cross-sectional ratio | Total length of electret sheet | Volume charge density |
|---|---|---|---|---|---|---|
|  |  | Flute | Liner | (%) | (cm/cm$^2$) | (nC/cm$^3$) |
| Working Examples | Working Example 1 | Production Example I | → | 93.4 | 13.8 | 29 |
|  | Working Example 2 | Production Example II | → | 90.1 | 13.7 | 193 |
|  | Working Example 3 | Production Example III | → | 92.7 | 13.7 | 144 |
|  | Working Example 4 | Production Example IV | → | 82.9 | 13.6 | 248 |
|  | Working Example 5 | Production Example V | → | 70.5 | 13.5 | 118 |
|  | Working Example 6 | Production Example VI | → | 91.5 | 13.7 | 167 |
|  | Working Example 7 | Production Example II | → | 77.3 | 30.6 | 431 |
| Comparative examples | Comparative Example 1 | Production Example VII | → | 91.8 | 13.7 | 21 |
|  | Comparative example 2 | Production Example VIII | → | 76.5 | 13.5 | 4 |

|  |  | Test examples Filter performance | |
|---|---|---|---|
|  |  | Evaluation | Collection rate (%) |
| Working Examples | Working Example 1 | Δ | 55 |
|  | Working Example 2 | ○ | 86 |
|  | Working Example 3 | ○ | 72 |
|  | Working Example 4 | ○ | 88 |

TABLE 4-continued

| | | | |
|---|---|---|---|
| | Working Example 5 | ○ | 75 |
| | Working Example 6 | ○ | 76 |
| | Working Example 7 | ○ | 93 |
| Comparative examples | Comparative Example 1 | X | 39 |
| | Comparative example 2 | X | 9 |

Test Examples (Channel Cross-Sectional Ratio)

Using the filter obtained in each of the working examples and comparative examples, a cross section was produced using a cutter so that the cross section was perpendicular to the air channel direction, and a magnified image was obtained by the digital camera photography of the cross section. The area of the space (air channels) in an observed region was measured by using an image analyzer (trade name: LUZEXR AP manufactured by Nireco Corporation) on the image so as to obtain the channel cross-sectional ratio (Sr).

(Volume Charge Density)

Using the filter obtained in each of the working examples and comparative examples, a cross section was produced using a cutter so that the cross section was perpendicular to the air channel direction, and a magnified image was obtained by the digital camera photography of the cross section. The total length (Ls) per unit area of the electret sheet was obtained by using an image analyzer (trade name: LUZEXR AP manufactured by Nireco Corporation).

Next, the volume charge density (Qa) of the filter was determined by calculation using the following calculation formula from the total length (Ls) per unit area of the electret sheet and the amount of charge (Qs) per unit area of the electret sheet.

$$Qa = Ls \times Qs$$

Qa: volume charge density ($nC/cm^3$) of filter
Ls: total length per unit area ($cm/cm^2$) of electret sheet
Qs: amount of charge per unit area ($nC/cm^2$) of electret sheet (Collection Rate)

An evaluation filter 38 was produced by cutting the electret filter obtained in each of the working examples and comparative examples with a cardboard cutter so as to form a cube with a width of 50 mm, a height of 50 mm, and a length of 50 mm.

Figure 17:
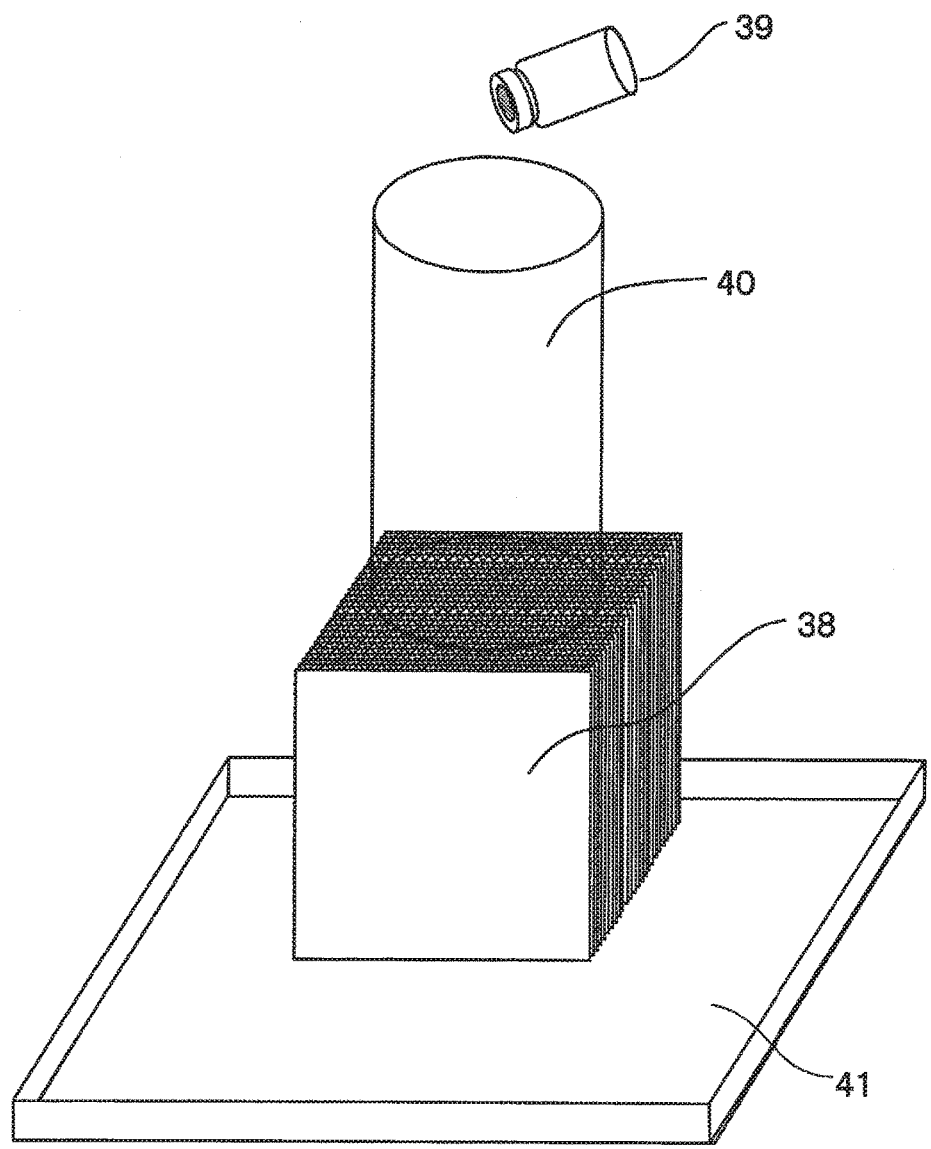
FIG. 17 is a schematic diagram of the collection rate measuring method used in the working examples of the present invention.

Next, the evaluation filter 38 was mounted on the collection rate measurement device illustrated in FIG. 17 so that the open cross section faced upward, and a receptacle 41 was mounted beneath the filter so that the spacing of the evaluation filter 38 was 5 mm. Further, a glass tube 40 with a diameter of 40 mm and a length of 100 mm was mounted on the receptacle.

The entire amount of an evaluation powder was supplied to the evaluation filter 38 so as to drop down uniformly from a powder supply bottle 39 filled with 1.0 g of surface-treated calcium carbonate (trade name: KALFAIN 200 manufactured by MARUO CALCIUM CO., LTD.) as an evaluation powder, and after dry air was circulated for one minute from the upper part of the glass tube 40 at a wind speed of 1 m/sec following the supply of the powder, the respective weights of the evaluation filter 38, the powder supply bottle 39, the glass tube 40, and the receptacle 41 were measured. The collection rate (Ep) was determined from the following calculation formula.

$$Ep = (Wfa - Wf0)/((Wb0 - Wba) - (Wpa - Wp0)) \times 100$$

Figure 18:
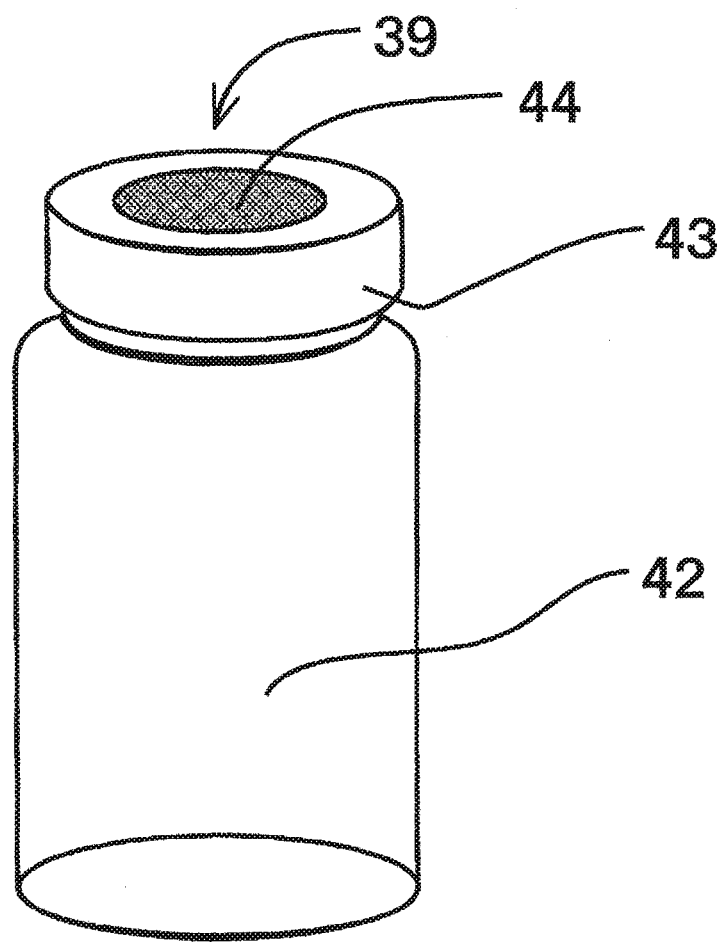
FIG. 18 is a schematic diagram of a powder supply bottle used in the measurement of the collection rate in the working examples of the present invention.

Ep: collection rate (%)
Wf0: weight of evaluation filter before test
Wfa: weight of evaluation filter after test
Wb0: weight of powder supply bottle before test
Wba: weight of powder supply bottle after test
Wp0: weight of glass tube before test
Wpa: weight of glass tube after test The powder supply bottle 39 that was used had a structure such as that illustrated in FIG. 18, wherein an opening part (not illustrated) was provided in the central part of a lid 43, and a 200-mesh plain-woven wire netting 44 was attached to the opening part.

The viability was evaluated from the obtained collection rates under the following criteria as a standard indicating the collection performance of the filters obtained in each of the working examples and comparative examples.

○: good; collection rate of 70% or higher
△: fair; collection rate of not less than 50% and less than 70%
X: poor; collection rate of less than 50%

(Dust Elimination Rate)

An evaluation filter 45 was produced by cutting the electret filter obtained in Working Example 2 with a cardboard cutter, so as to form a rectangular parallelepiped having a width of 100 mm, a height of 80 mm in the side in which air channels were formed, and a channel length (depth) of 10 mm.

Figure 19:
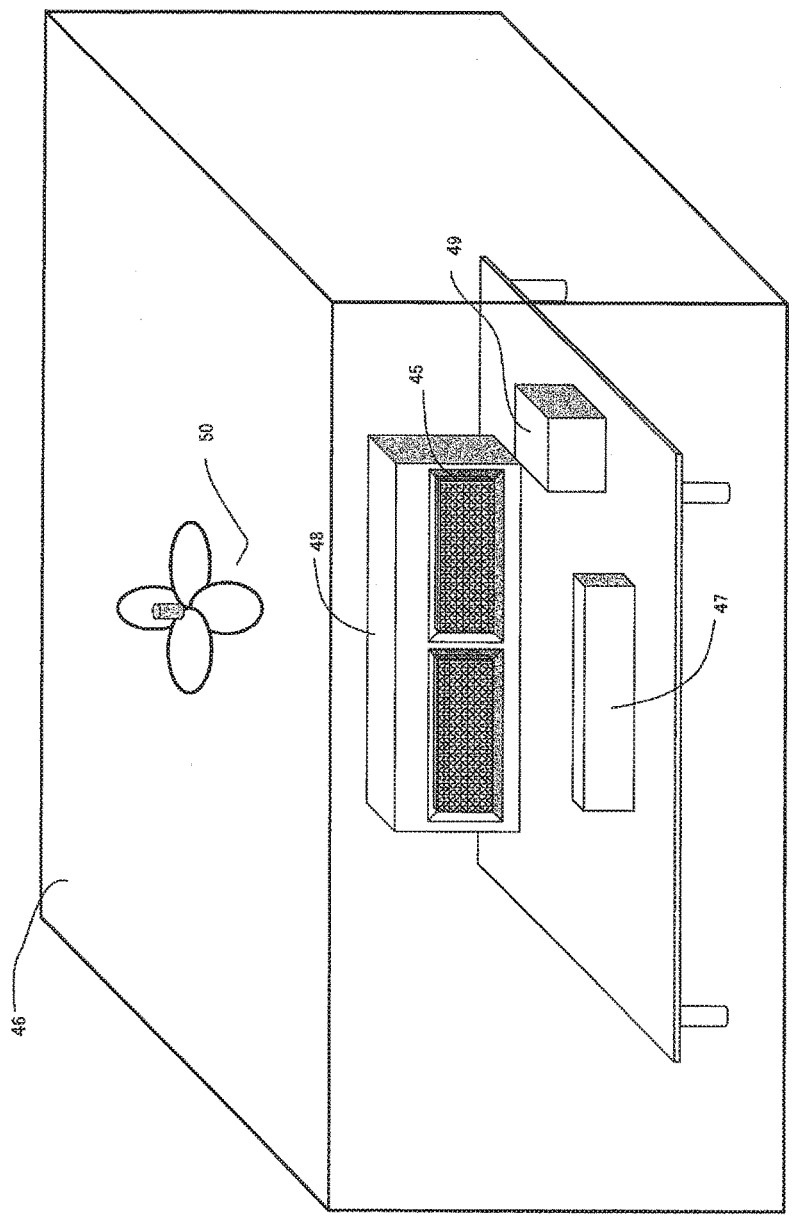
FIG. 19 is a schematic diagram of the equipment used in the measurement of the dust elimination rate in the working examples of the present invention.

As illustrated in FIG. 19, a digital dust meter 47 (trade name: DUST MATE LD-3K2 manufactured by SIBATA SCIENTIFIC TECHNOLOGY LTD.), and air conditioning unit 48, an ion generator 49, and a stirring fan 50 were mounted inside a clean booth 46 having an internal volume of 30 $m^3$, and the evaluation filter 45 was attached to the suction port of the air conditioning unit 48.

Five cigarettes were burned inside the clean booth 46 in which the stirring fan 50 was activated. The initial dust concentration $C_0$ was adjusted to 4000 to 6000 $mg/m^3$, and the stirring fan 50 was stopped 14 minutes later. The air conditioning unit 48 was activated 30 seconds later, and the measurement of the dust concentration was then started another 30 seconds later. The dust concentration Cn was measured for 120 minutes in 10 minute intervals with the digital dust meter 47, and the removal rate (Ee) for every 10 minutes was determined from the following calculation formula.

$$Ee = (C_0 - C_n)/C_0 \times 100$$

Ee: Dust elimination rate (%)
$C_0$: initial dust concentration
$C_n$: dust concentration at each time The dust elimination rate (Ee) of the filter obtained in Working Example 2 after 120 minutes was 99%, indicating that the filter was effective for eliminating fine dust such as cigarette smoke.

The present invention was described in detail and with reference to specific embodiments above, but it will be clear to persons skilled in the art that various changes and modifications can be made without departing from the spirit and scope of the present invention.

INDUSTRIAL APPLICABILITY

The filter of the present invention is a low pressure loss filter having a high dust- and dirt-collecting capability and highly sustainable collecting capability, so the filter is useful as a filter for a dust collector, an air conditioning unit, an air conditioner, a humidifier, or the like and is extremely useful for dust collection in confined spaces in an office, factory, clean room, household, or the like.

REFERENCE SIGNS LIST 1 resin film layer (A)
2 base layer
3a surface layer (front layer)
3b surface layer (back layer)
4a, 4b undulating shapes (irregular shapes)
5 filter
6, 6a, 6b liners
7 flute
7a electret sheet processed into a wave shape
7b electret sheet processed into a pleated shape
8 adhesive
9 electret sheet
10 pillar structure
11 resin film layer (A)
12 DC high-voltage power supply
13 needle-shaped application electrode
14 plate-shaped ground electrode (planar array)
15 wire-shaped application electrode
16 needle-shaped application electrode
17 roller-shaped ground electrode
18 wire-shaped application electrode
19 needle-shaped application electrode (horizontal array)
21 roller
22 electret sheet
23 DC high-voltage power supply
24 needle-shaped application electrode (horizontal array)
25 roller-shaped ground electrode
26 guide roller (ground earth connection)
27 nip roller
28 nip roller
30 electret sheet
31 ground electrode plate
32 main electrode plate
33 programmable hot plate
34 thermocouple
35 thermometer
36 ammeter
37 computer
38 evaluation filter (electret filter)
39 powder supply bottle
40 glass tube
41 receptacle
42 bottle
43 lid
44 wire netting
45 evaluation filter
46 clean booth
47 digital dust meter
48 air conditioning unit
49 ion generator
50 stirring fan

The invention claimed is:

1. A filter having air channels formed using an electret sheet comprising a thermoplastic resin; a porosity of the electret sheet being from 1 to 70%; an air channel cross-sectional ratio of the filter being from 10 to 99%; and a volume charge density of the filter being from 10 to 5000 nC/cm$^3$;
wherein the electret sheet contains voids.

2. The filter according to claim 1, wherein the thermoplastic resin comprises a polyolefin-based resin.

3. The filter according to claim 2, wherein the polyolefin-based resin comprises a polypropylene-based resin.

4. The filter according to claim 3, wherein the electret sheet comprises from 50 to 98 mass % of a polypropylene-based resin, from 1 to 49 mass % of a polyethylene-based resin, and from 1 to 49 mass % of at least one of an inorganic fine powder and an organic filler.

5. The filter according to claim 1, wherein the electret sheet is stretched in at least one axial direction.

6. The filter according to claim 1, wherein a dielectric constant of the electret sheet is from 1.1 to 2.5.

7. The filter according to claim 1, wherein the electret sheet comprises a sheet charged by a DC corona discharge.

8. The filter according to claim 1, wherein an arithmetic average surface roughness (SRa) of the electret sheet is from 0.1 to 5 μm.

9. The filter according to claim 1, wherein the air channels are formed by alternately laminating the electret sheet processed into a wave shape by corrugation and the electret sheet with a flat shape not subjected to corrugation and then adhering or fusing the sheets.

10. An electret sheet used in the filter according to claim 1.

* * * * *